(12) United States Patent
Okazaki et al.

(10) Patent No.: US 8,157,305 B2
(45) Date of Patent: Apr. 17, 2012

(54) ROBOT HAND AND ROBOT ARM

(75) Inventors: Yasunao Okazaki, Shiga (JP); Masaki Yamamoto, Nara (JP)

(73) Assignee: Panasonic Corporation, Osaka (JP)

( * ) Notice: Subject to any disclaimer, the term of this patent is extended or adjusted under 35 U.S.C. 154(b) by 65 days.

(21) Appl. No.: 12/670,421

(22) PCT Filed: Jun. 24, 2009

(86) PCT No.: PCT/JP2009/002887
§ 371 (c)(1),
(2), (4) Date: Jan. 25, 2010

(87) PCT Pub. No.: WO2009/157190
PCT Pub. Date: Dec. 30, 2009

(65) Prior Publication Data
US 2010/0207412 A1 Aug. 19, 2010

(30) Foreign Application Priority Data

Jun. 27, 2008 (JP) .................................. 2008-168388

(51) Int. Cl.
B25J 15/08 (2006.01)
B25J 15/02 (2006.01)
(52) U.S. Cl. .......... 294/111; 294/106; 294/907; 901/34; 901/46
(58) Field of Classification Search .................. 294/106, 294/111, 907; 901/32–34, 36, 39, 46; 623/63, 623/64
See application file for complete search history.

(56) References Cited

U.S. PATENT DOCUMENTS

| 4,643,473 | A | * | 2/1987 | Douglas ........................ 294/111 |
| 5,062,673 | A | * | 11/1991 | Mimura ........................ 294/111 |
| 5,447,403 | A | * | 9/1995 | Engler, Jr. ........................ 414/4 |
| 5,570,920 | A | * | 11/1996 | Crisman et al. ................ 294/111 |
| 5,647,723 | A | * | 7/1997 | Rush ............................. 414/735 |
| 7,296,835 | B2 | * | 11/2007 | Blackwell et al. ............ 294/111 |

FOREIGN PATENT DOCUMENTS

JP 34-7960 9/1959

(Continued)

OTHER PUBLICATIONS

International Search Report issued Aug. 4, 2009 in corresponding International (PCT) Application No. PCT/JP2009/002887.

(Continued)

*Primary Examiner* — Dean Kramer
(74) *Attorney, Agent, or Firm* — Wenderoth, Lind & Ponack, L.L.P.

(57) ABSTRACT

A force sensor is disposed on a base portion, a finger base on which a pair of fingers are opposed to each other is disposed on a measuring unit of the force sensor, a finger driving mechanism base is disposed on the base portion so as to not contact the force sensor, the finger base or the fingers, and finger driving mechanisms are disposed on the finger driving mechanism base so finger opening and closing driving force vectors face each other within a plane on which the pair of the opposed fingers are moved to open or close so as to cancel each other, such that the fingers are driven so the resultant force is virtually zero. An actuator, is installed at a place other than the base portion, the force sensor, the finger base, or the fingers and the finger driving mechanism base, and drives the finger driving mechanism.

14 Claims, 20 Drawing Sheets

FOREIGN PATENT DOCUMENTS

| | | |
|---|---|---|
| JP | 63-312087 | 12/1988 |
| JP | 01-252386 | 10/1989 |
| JP | 5-196 | 1/1993 |
| JP | 06-206191 | 7/1994 |
| JP | 11-347979 | 12/1999 |
| JP | 2003-001581 | 1/2003 |

OTHER PUBLICATIONS

English translation of International Report on Patentability and Written Opinion of the International Searching Authority issued Feb. 17, 2011 in corresponding International Application No. PCT/JP2009/002887.

* cited by examiner

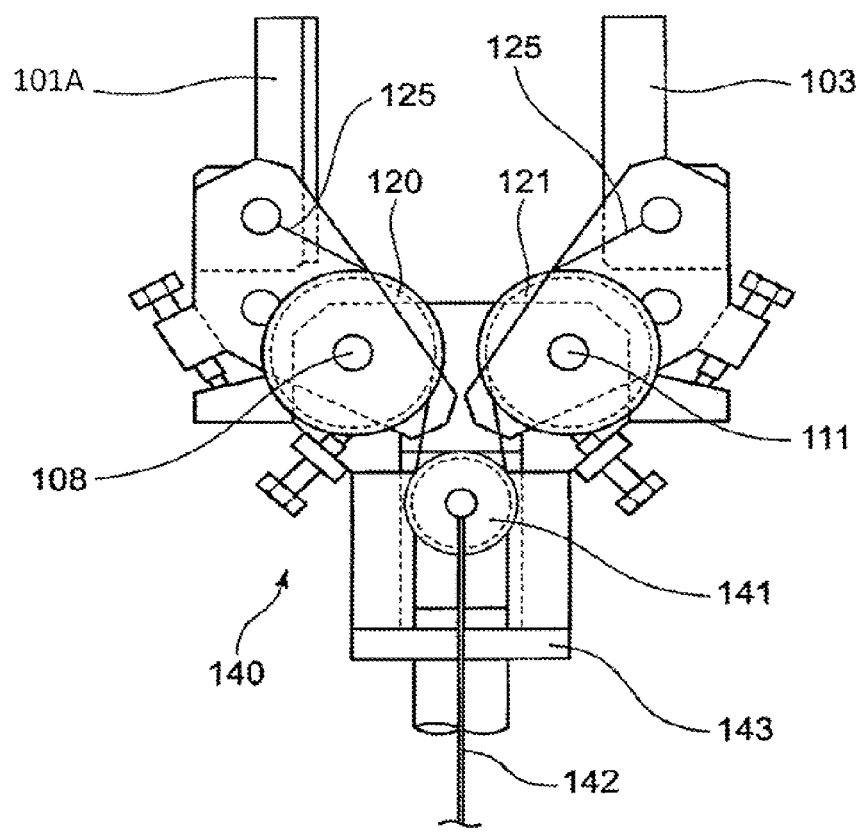
Fig. 11 - PRIOR ART though even when a force sensor is placed between the hand 140 and the end portions (for example, at a position of 143) of the robot arm so as to force-control the robot arm relative to an external force to be exerted on the hand 140, the force sensor fails to accurately measure the external force because the driving force used for driving the opening/closing movements of the fingers 101A and 103 from the outside gives adverse effects to the force sensor, resulting in an issue in which it is not possible to carry out a force controlling operation with high precision.

ROBOT HAND AND ROBOT ARM

TECHNICAL FIELD

The present invention relates to a robot hand that is applicable to an end effector of a mechanical device, such as a robot arm, and also concerns a robot arm having such a robot hand.

BACKGROUND ART

As an end effector to be used for achieving various operations in a robot arm, a hand, which is capable of holding an object or the like serving as a work subject, has been utilized. The hand, which is attached to the tip of a robot arm, needs to have a small size and light weight so as to make the load of the robot arm as small as possible.

In order to satisfy these demands, in the conventional art, a light-weight hand having a simple structure has been proposed in which, as shown in FIG. 11, two movable fingers 101A and 103, fixed pulleys 120, 121 and a movable pulley 141, which are rotatably secured to joint shafts 108 and 111, and a wire 125, secured to the two movable fingers 101A and 103 through the fixed pulleys 120 and 121 and the movable pulley 141, are provided so that, by driving the movable pulley 141 to make a translation movement, the wire 125 is pulled so that each of the fingers 101A and 103 is driven to carry out an opening/closing movement (see JP-B No. 5-196).

SUMMARY OF THE INVENTION

In the structure of JP-B No. 5-196, since a powerful actuator to be used for increasing its grip strength causes a bigger size and heavy weight, a powerful actuator is disposed outside a hand 140, in an attempt to increase the grip strength of the hand 140, that is, the movable fingers 101A and 103, with its light weight being maintained, so that the opening/closing movements of the fingers 101A and 103 need to be driven by, for example, a wire 142 from the outside.

However, in a case of a structure in which the opening/closing movements of the fingers 101A and 103 are driven from the outside, even when a force sensor is placed between the hand 140 and the end portions (for example, at a position of 143) of the robot arm so as to force-control the robot arm relative to an external force to be exerted on the hand 140, the force sensor fails to accurately measure the external force because the driving force used for driving the opening/closing movements of the fingers 101A and 103 from the outside gives adverse effects to the force sensor, resulting in an issue in which it is not possible to carry out a force controlling operation with high precision.

The object of the present invention is to solve the above-mentioned issues with the conventional joint mechanism, and consequently to provide a robot hand that is light weight and has a high grip strength because an actuator can be disposed outside the hands, and, even in a case where a force sensor is attached between the hand and the end portions of the robot arm, makes the force sensor less susceptible to influences from a driving force that drives the opening/closing movements of the fingers from the outside, and consequently carries out a force controlling operation easily, and a robot arm having such a robot hand.

In order to achieve the above-mentioned object, the present invention has the following structure:

In accordance with one aspect of the present invention, there is provided a robot hand which is characterized by including:

a hand attaching base portion;
a force sensor disposed on the hand attaching base portion;
a finger base that is disposed on a measuring unit for the force sensor;
a pair of fingers that are disposed on the finger base so as to be opposed to each other;
a finger-driving mechanism base that is disposed on the hand attaching base portion, with gaps being defined by the force sensor, the finger base, and the paired fingers;
a finger driving mechanism that has a wire having respective end portions connected to the paired fingers opposed to each other while being disposed on the finger-driving mechanism base so as to allow paths extending from the end portions to be opposed to each other so that, by pulling the wire in opposite directions with a same force, the paired fingers are opened and closed; and
an actuator that is disposed outside the hand, and used for operating the finger driving mechanism.

In accordance with another aspect of the present invention, there is provided a robot arm in which an end portion thereof is attached to the hand attaching base portion of the robot hand defined in the above-mentioned aspect.

In accordance with the present invention, a force, generated by pulling the wire of the finger driving mechanism, is received by the finger driving mechanism base, and by pulling the wire in an opposite direction by the same force, the generated forces cancel each other so that, since no effects are given to the force sensor, an actuator can be installed on the outside of the hands. Thus, it becomes possible to provide a robot hand that is light weight and has a high gripping force, and, even in a case where the force sensor is attached between the hand and the end portions of the robot arm, makes the force sensor less susceptible to influences from a driving force that drives the opening/closing movements of the fingers from the outside, and consequently carries out a force controlling operation easily.

BRIEF DESCRIPTION OF THE DRAWINGS

These and other aspects and features of the present invention will become clear from the following description taken in conjunction with the preferred embodiments thereof with reference to the accompanying drawings, in which:

FIG. 11 is a view that explains a structure of a conventional robot hand.

DETAILED DESCRIPTION OF THE INVENTION

Figure 1A:
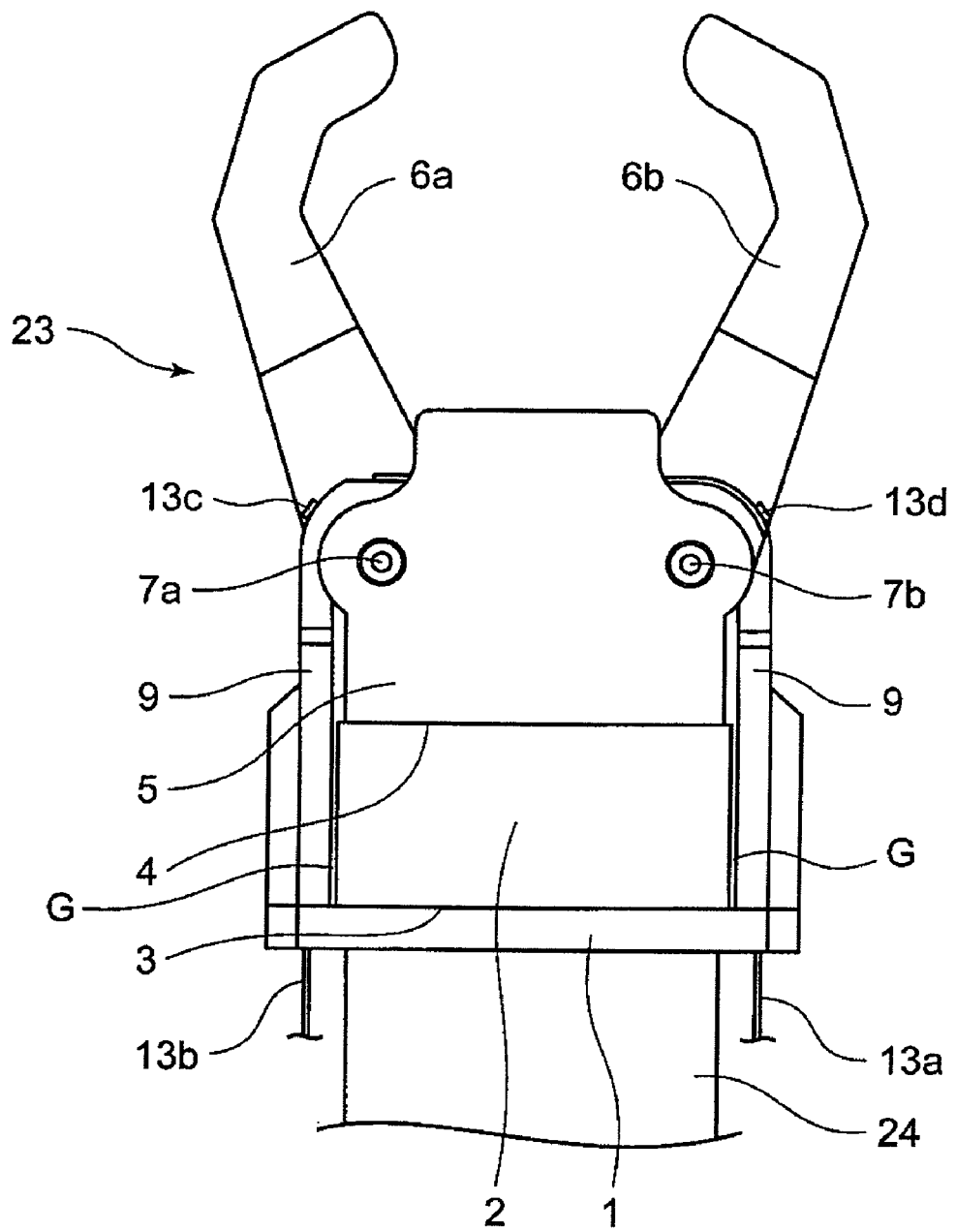
FIG. 1A is a front view that shows a schematic structure of a robot hand in accordance with a first embodiment of the present invention.

Prior to detailed explanations of the embodiments of the present invention by reference to the drawings, the following description will discuss various aspects of the present invention.

According to a first aspect of the present invention, there is provided a robot hand comprising:

a hand attaching base portion;

a force sensor disposed on the hand attaching base portion;

a finger base that is disposed on a measuring unit for the force sensor;

a pair of fingers that are disposed so as to be opposed to each other on the finger base;

a finger-driving mechanism base that is disposed on the hand attaching base portion, with gaps being defined by the force sensor, the finger base, and the paired fingers;

a finger driving mechanism that has a wire having respective end portions connected to the paired fingers opposed to each other, that is disposed on the finger-driving mechanism base so as to allow paths extending from the end portions to be opposed to each other so that, by pulling the wire in opposite directions with a same force, the paired opposed fingers are opened and closed; and an actuator that is disposed outside the hand, and used for operating the finger driving mechanism.

According to a second aspect of the present invention, there is provided the robot hand according to the first aspect, wherein the finger driving mechanism base has a wire guide unit for guiding a movement of the wire of the finger driving mechanism.

According to a third aspect of the present invention, there is provided the robot hand according to the first aspect, wherein the finger driving mechanism comprises: a movable pulley that is supported by a rotation shaft connected to the actuator so as to rotate thereon, and is also supported by the finger driving mechanism base so as to move together with the rotation shaft in a direction that intersects a center axis direction of the rotation shaft so that, by pulling the wire in opposite directions by the same force without regulating movements of the paired opposed fingers in a same direction, movements in reversed directions of the paired opposed fingers are generated so that the paired opposed fingers are opened or closed.

According to a fourth aspect of the present invention, there is provided the robot hand according to the second aspect, wherein the paired fingers are supported by a pair of joint shafts supported so as to be opposed to the finger base, in a manner so as to rock respectively thereon, and have finger-joint shaft arc-shaped guide portions each having an arc shape that is coaxial with each of the joint shafts, the finger driving mechanism base has arc-shaped guide grooves each having an arc shape that is coaxial with each of the joint shafts, with the end portion of the wire being engaged with one of the paired fingers, so that the wire is passed along an arc-shaped face of the finger-joint shaft arc-shaped guide portion of the corresponding finger, disposed in parallel with a measuring face of the force sensor for measuring a force applied between the base portion of the finger and the base of the hand as well as in parallel with the attaching face of the force sensor of the hand attaching base portion, and is also passed over to the arc-shaped guide groove that is coaxial with the joint shaft that supports the other finger that is opposed to the corresponding finger so that the wire is disposed on the finger driving mechanism base in a manner so as to make paths extending from the end portions to be made face to face with each other.

According to a fifth aspect of the present invention, there is provided the robot hand according to any one of the first to third aspects, wherein the finger driving mechanism has the wire, paired first fixed pulley and second fixed pulley that are respectively secured coaxially onto the finger driving mechanism base so as to rotate thereon, and a movable pulley that is supported on a rotation shaft connected to the actuator so as to rotate thereon, and is also supported by the finger driving mechanism base so as to move in a direction that intersects the center axis direction of the rotation shaft together with the rotation shaft, so that, with the end portion of the wire being connected to one of the opposed fingers, the wire is passed through the first fixed pulley, the movable pulley, and the second fixed pulley in succession, with the other end portion different from the end portion being connected to the other opposed finger, and by driving the actuator, the rotation shaft of the movable pulley is moved in a direction that intersects a center axis direction of the rotation shaft relative to the finger driving mechanism base to allow the paired fingers to open or close.

According to a sixth aspect of the present invention, there is provided the robot hand according to any one of the first to fifth aspects, wherein the finger has a bow-like curved shape, or a shape having a tip portion curved into the shape of the letter L (i.e., an L shape).

According to a seventh aspect of the present invention, there is provided a robot arm comprising: an end portion thereof that is attached to the hand attaching base portion of the robot hand in accordance with any one of the first to sixth aspects.

Referring to drawings, the following description will discuss embodiments of the present invention.

First Embodiment

Figure 1B:
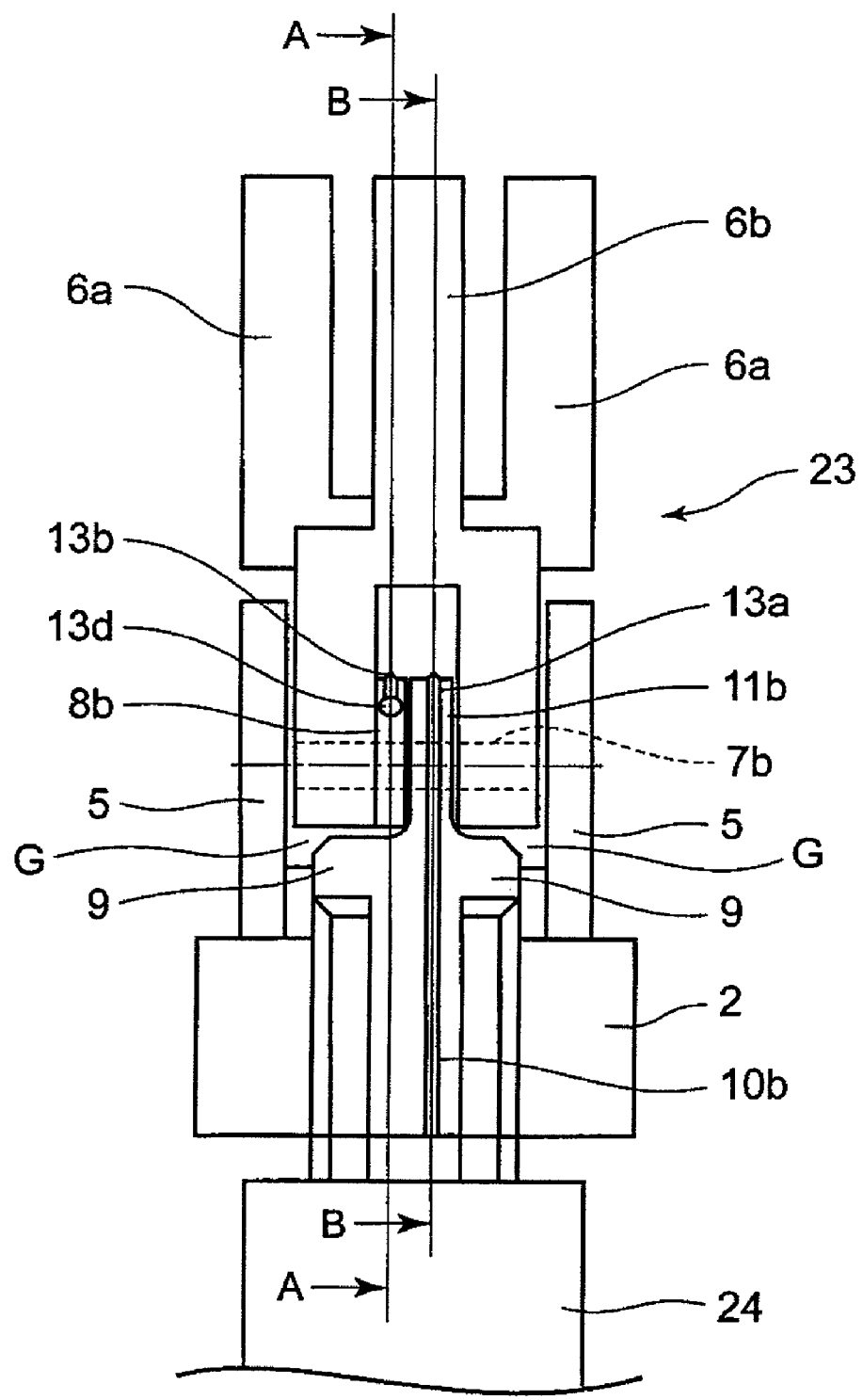
FIG. 1B is a side view that shows a schematic structure of the robot hand in accordance with the first embodiment of the present invention of FIG. 1A.
Figure 2A:
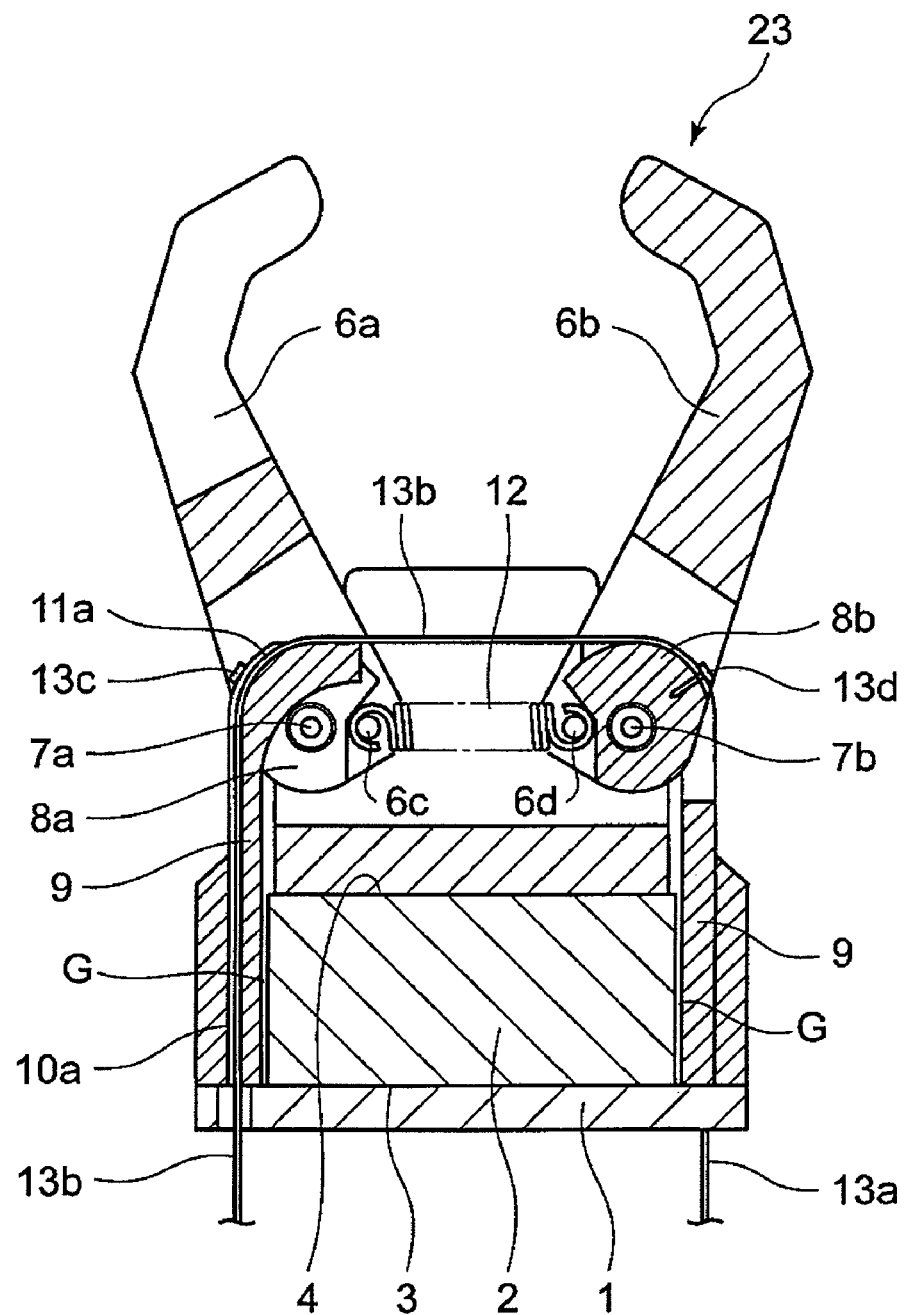
FIG. 2A is cross-sectional view taken along line A-A of FIG. 1A that shows a cross section of the robot hand in accordance with the first embodiment of the present invention of FIG. 1A.
Figure 2B:
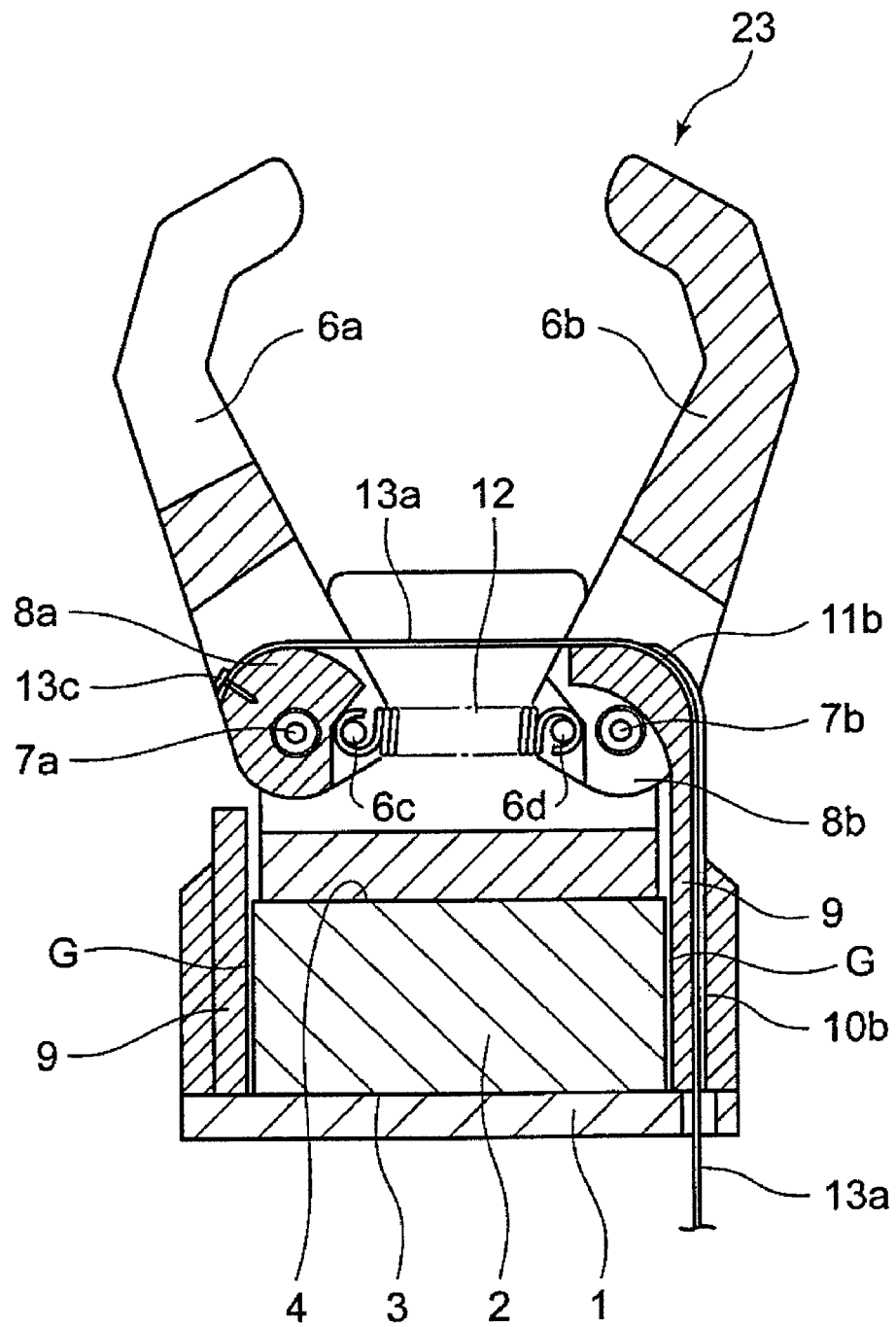
FIG. 2B is a cross-sectional view taken along line B-B of FIG. 1A that shows a cross section of the robot hand in accordance with the first embodiment of the present invention of FIG. 1A.
Figure 3:
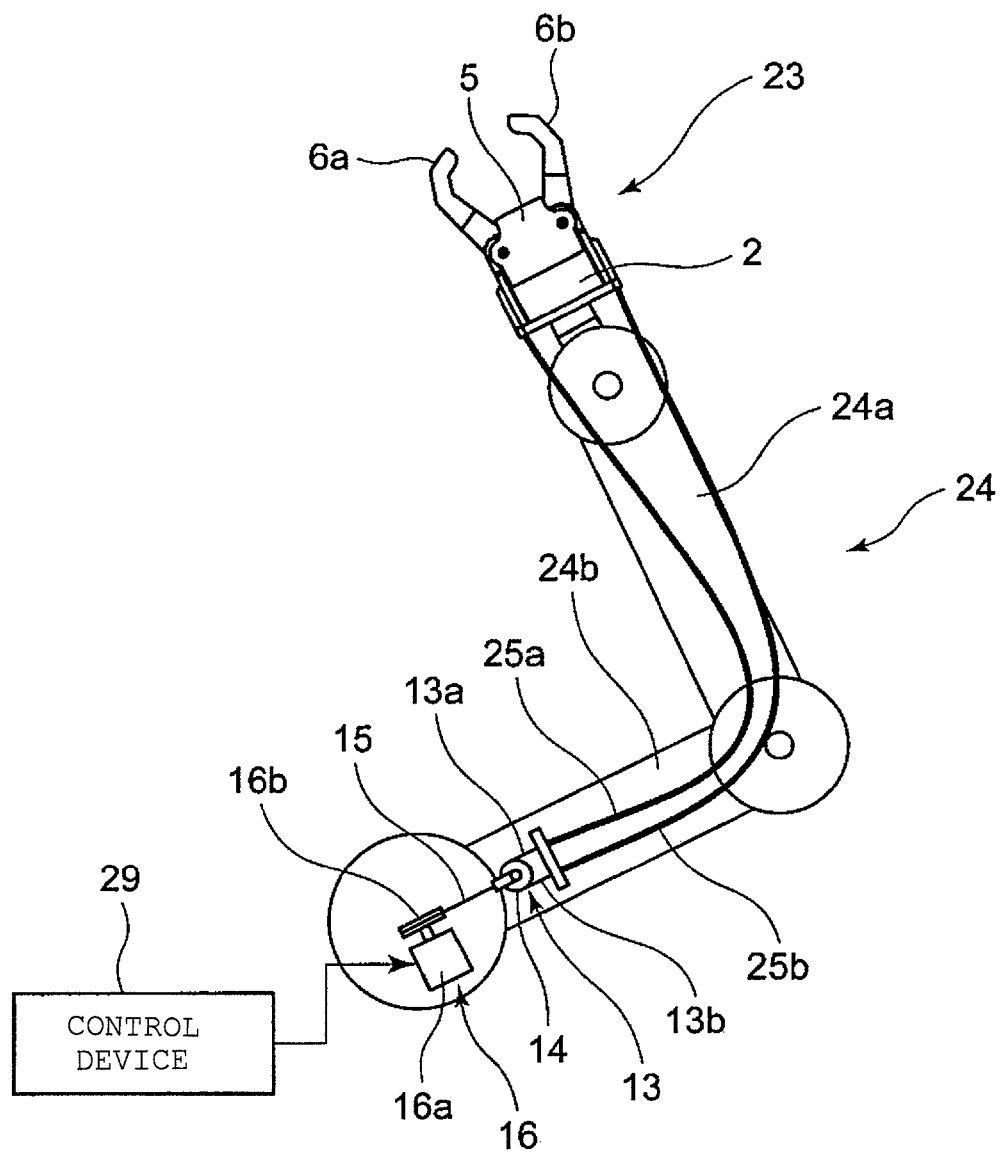
FIG. 3 is a view that shows an applied example in which the robot hand in accordance with the first embodiment of the present invention of FIG. 1A is attached to a robot arm.

FIGS. 1A and 1B are views that show schematic structures of a robot hand 23 in a first embodiment of the present invention. FIGS. 2A and 2B are views that respectively show cross sections taken along lines A-A and B-B in FIG. 1B. FIG. 3 is a view that shows an applied example in which the robot hand 23 is attached to an end portion of a robot arm 24.

Reference numeral 1 represents a hand attaching base portion that functions as a base which is used for attaching the robot hand 23 to the end portion of the robot arm 24.

Reference numeral 2 represents a hexaxial force sensor that is one example of a force sensor utilizing a strain gauge, and is installed on the hand attaching base portion 1. The hexaxial force sensor 2 is capable of measuring a force that is exerted between an attaching face 3 opposed to the plane of the surface of the hand attaching base portion 1 and a measuring face (measuring unit)(force active face) 4 on the side opposite to the attaching face 3. The surface of the hand attaching base portion 1, the attaching face 3, and the measuring face 4 are disposed in parallel with one another.

Reference numeral 5 is a finger base that functions as a base plate used for supporting fingers 6a and 6b (to be described below) respectively so that the fingers can rock thereon, and, as shown in FIG. 1B, a pair of these finger bases are placed on the measuring face 4 of the hexaxial force sensor 2.

Reference numerals 6a and 6b indicate the fingers, each having a bent shape (for example, a curved shape like a bow, or a shape having a tip portion that is curved into an L-shape), and these are placed so as to be opposed to each other, with the base end portions of the fingers 6a and 6b being disposed on a pair of finger bases 5 so as to freely rotate around finger joint shafts 7a and 7b supported on the finger bases 5. A pair of the fingers 6a are provided and are referred to as first fingers. The finger 6b, referred to as a second finger, is disposed so as to be opposed to the middle position between the paired first fingers 6a (see FIG. 1B).

Reference numeral 12 represents a finger releasing spring for urging the fingers 6a and 6b in releasing directions, and is disposed in a manner so as to bridge between a protrusion 6c that is located on a base end portion of the first finger 6a on the second finger 6b side from the finger joint shaft 7a and a protrusion 6d that is located on a base end portion of the second finger 6b on the first finger 6a side from the finger joint shaft 7b. As a result, normally, by a spring force of the finger releasing spring 12, in FIG. 2A, the first fingers 6a are urged so as to rotate counterclockwise around the finger joint shaft 7a, while the second finger 6b is urged so as to rotate clockwise around the finger joint shaft 7b, with the result that the tips of the first fingers 6a and the tip of the second finger 6b are urged in mutually opening directions.

Reference numeral 9 represents a pair of finger driving mechanism bases that are disposed on the hand attaching base portion 1, without being in contact with any of the finger bases 5 and the fingers 6, that is, with gaps G being formed between the finger driving mechanism bases 9 and each of the force sensor 2, the finger bases 5, and the paired fingers 6 (6a and 6b). Each of the finger driving mechanism bases 9 has arc-shaped guide grooves 11a and 11b that are respectively coaxial with the joint shafts 7a and 7b and have arc shapes, and serves as a base portion used for smoothly driving two finger-driving wires 13a and 13b (or a single wire 13) that are one example of a finger driving mechanism that will be described below.

Reference numerals 13a and 13b represent two finger driving wires corresponding to one example of the finger driving mechanism, and are respectively disposed so as to rock along guide grooves 10a and 10b of the finger driving mechanism bases 9, which serve as one example of wire guide portions. One end portion of each of the two finger driving wires 13a and 13b is secured to a finger-joint shaft arc-shaped guide portion 8a or 8b that is formed on the base end portion of the finger 6a or 6b, by a pin 13c or 13d. Each of these finger-joint shaft arc-shaped guide portions 8a or 8b has an arc shape that is coaxial with the joint shaft 7a or 7b, and is integrally formed with the base end portion of the finger 6a or 6b. In this specification, for convenience of explanation for the relationship between the two fingers 6a and 6b and the two finger driving wires 13a and 13b, the two finger driving wires 13a and 13b are explained, with the other end portions thereof being coupled with each other; however, actually, these wires may be prepared as a single wire 13.

The finger driving wire 13a for driving the first finger 6a has its one end secured to the finger joint-shaft arc-shaped guide portion 8a by the pin 13c, as shown in FIG. 2B, and is allowed to pass along an arc face of the finger-joint shaft arc-shaped guide portion 8a from its one end, and then bridged over to the arc-shaped guide groove 11b of the finger driving mechanism base 9 in parallel with the measuring face 4 of the hexaxial force sensor 2, and disposed so that the direction in which the finger driving wire 13a is placed is changed by 90°, while being curved along the arc-shaped guide groove 11b. Thereafter, it is disposed so as to pass through the side face of the finger driving mechanism base 9 along the guide groove 10b and to be separated from the finger driving mechanism base 9.

Moreover, the finger driving wire 13b for driving the second finger 6b has its one end secured to a finger joint-shaft arc-shaped guide portion 8b by a pin 13b, as shown in FIG. 2A, and is allowed to pass along an arc face of the finger-joint shaft arc-shaped guide portion 8b from its one end, and then bridged over to the arc-shaped guide groove 11a of the finger driving mechanism base 9 in parallel with the measuring face 4 of the hexaxial force sensor 2, and disposed so that the direction in which the finger driving wire 13b extends is changed by 90°, while being curved along the arc-shaped guide groove 11a. Thereafter, it is disposed so as to pass through the side face of the finger driving mechanism base 9 along the guide groove 10a and to be separated from the finger driving mechanism base 9.

As a result of this arrangement, as will be described later, vectors of driving forces to allow the pair of the opposed fingers 6a and 6b to move so as to open or close are made to be face to face with one another within a plane on which the pair of the opposed fingers 6a and 6b are moved to open or close so as to cancel one another, with the result that they are driven so as to make the resultant force virtually zero.

Additionally, the arc shapes of the finger-joint shaft arc-shaped guide portions 8a and 8b and the arc shapes of the arc-shaped guide grooves 11a and 11b are not necessarily required to have the same radius, and are only required to allow the positional relationship of the circumferential portions to have such a relationship that the tensions of the finger-driving wires 13a and 13b are made to cancel each other. Moreover, since the arc-shaped guide grooves 11a and 11b are only required to bend the wires 13a and 13b, the radii of the arc-shaped guide grooves 11a and 11b may be different from each other. In a case where the radii of the arc shapes of the finger-joint shaft arc-shaped guide portions 8a and 8b are different from each other, torques used for moving the first fingers 6a and the second finger 6b are made different from each other; therefore, these are desirably set to the same radius so as to simplify the operation controls of the first fingers 6a and the second finger 6b. However, in a case where complicated operation controls of the first fingers 6a and the second finger 6b can be used, the torques of the first fingers 6a and the second finger 6b may be made different from each other, and, even in such a case, the influences to the force sensor 2 can be eliminated, which is the object of the present invention.

As shown in FIG. 3, the two finger driving wires 13a and 13b are disposed in a manner so as to pass through the insides of the guide tubes 25a and 25b, along the two links 24a and 24b of the robot arm 24, with the other ends of the two finger-driving wires 13a and 13b being allowed to pass over a single movable pulley 14 and coupled to each other. One end portion of a pulling wire 15 is connected to a rotation shaft portion that supports the movable pulley 14 so as to freely move thereon. A wire pulling mechanism 16 using a motor 16a that functions as one example of an actuator is disposed on the other end on the side opposite to the one end portion of the pulling wire 15. That is, a rotation disc 16b is secured to the rotation shaft of the motor 16a, and the other end of the pulling wire 15 is secured to the rotation disc 16b so that, by rotating the rotation shaft of the motor 16a, the pulling wire 15 is wound up around the rotation disc 16b, and the pulling wire 15 is consequently pulled. When the pulling wire 15 is pulled, the two finger driving wires 13a and 13b are simultaneously pulled through the movable pulley 14.

The driving control of the motor 16a is carried out by a control device 29 for controlling operations of the hand 23.

The following description will discuss operations of the robot hand 23 in accordance with the first embodiment.

Figure 4A:
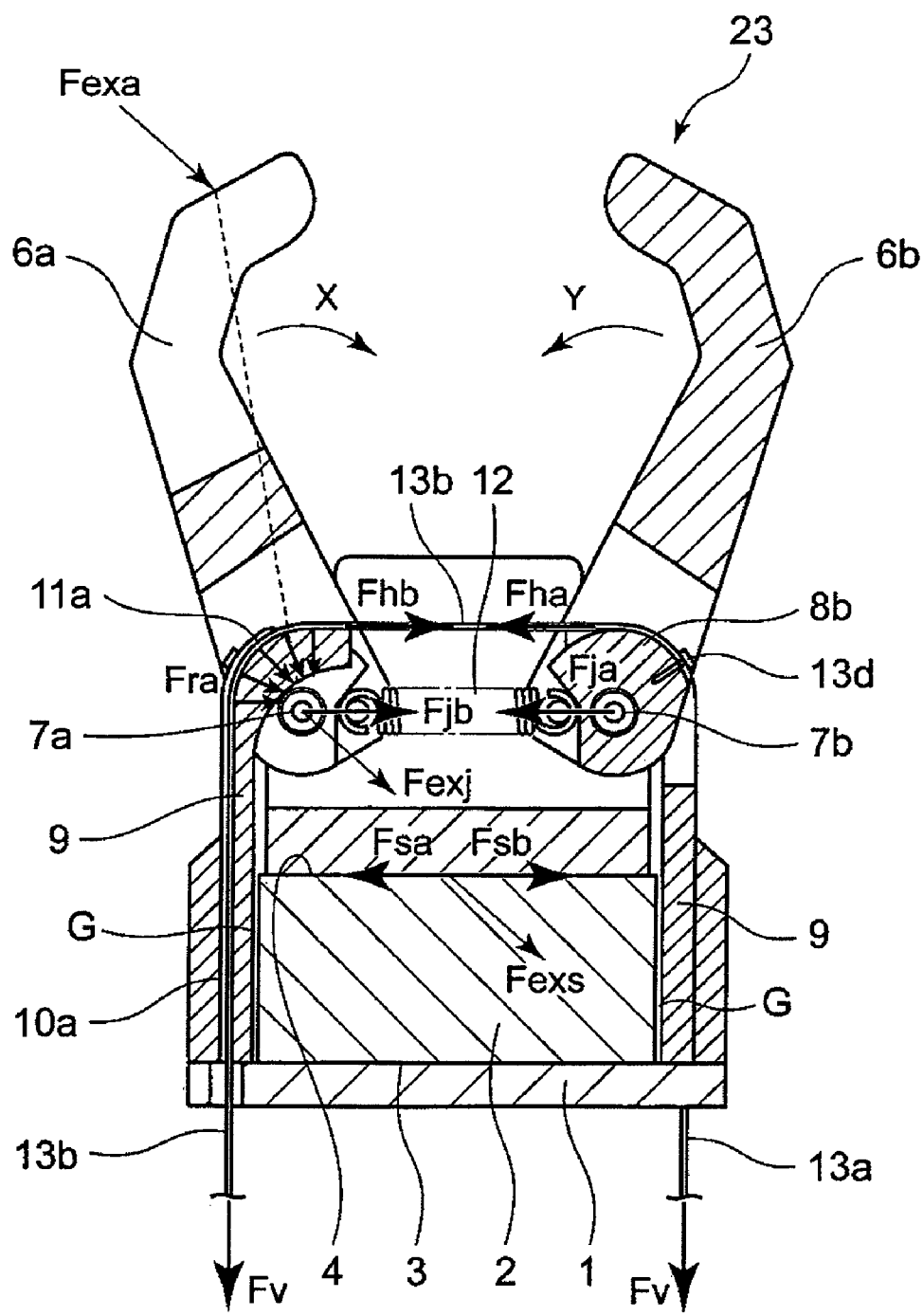
FIG. 4A is a view that explains an opening operation of the robot hand in accordance with the first embodiment of the present invention, along the line A-A of FIG. 1A.
Figure 4B:
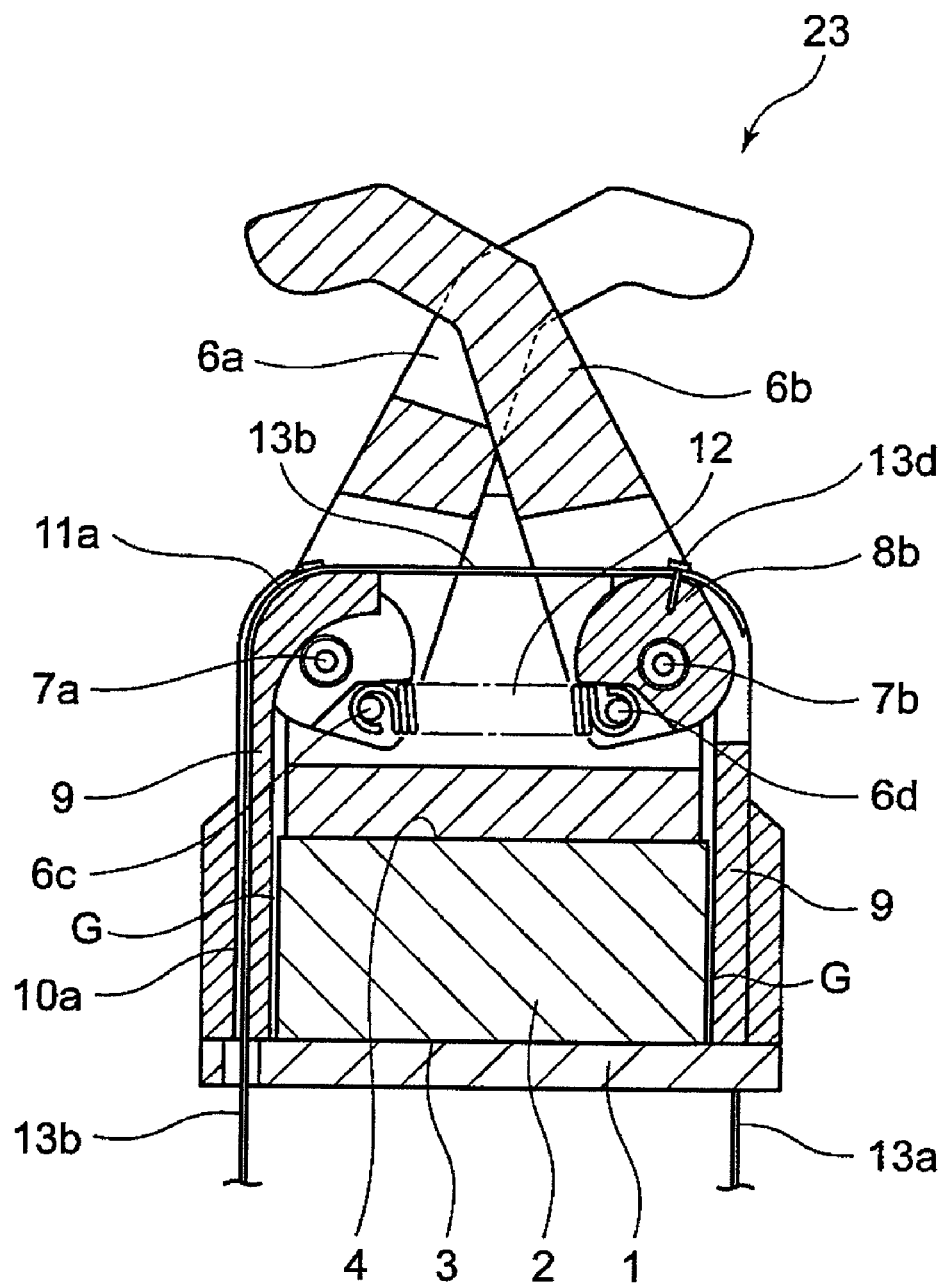
FIG. 4B is a view that explains a closing operation of the robot hand in accordance with the first embodiment of the present invention of FIGS. 1A, along the line A-A of FIG. 1A.

In a normal state, the robot hand 23 is kept in an open state as shown in FIG. 4A by a spring force of the finger releasing spring 12. The motor 16a is driven by instructions from the robot control device 29 so that the wire pulling mechanism 16 is operated, and when the pulling wire 15 is pulled, the movable pulley 14 is also pulled so that the joined portion (the middle portion in the case of a single wire 13) of the finger driving wires 13a and 13b, that is, the other two end portions on the movable pulley 14 side are pulled by equal forces (the same force) by the action of the movable pulley 14. Since one end of each of the finder driving wires 13a and 13b (two ends in the case of a single wire 13) is secured onto the first finger 6a or second finger 6b in the finger-joint shaft arc-shaped guide portion 8a or 8b, the pulling force is transmitted to the first finger 6a or the second finger 6b so that, when a torque caused by this pulling force overcomes the torque of the spring force of the finger releasing spring 12, the first finger 6a is allowed to rotate in a rightward direction as indicated by an arrow X on the drawing paper surface in FIG. 4A relative to the finger-joint shaft 7a (clockwise around the finger-joint shaft 7a in FIG. 4A), while the second finger 6b is allowed to rotate in a leftward direction as indicated by an arrow Y on the drawing paper surface in FIG. 4A relative to the finger-joint shaft 7b (counterclockwise around the finger joint shaft 7b in FIG. 4A), with the result that the hand 23 is set to a closed state as shown in FIG. 4B; thus, when an object to be grabbed is located between the first fingers 6a and the second finger 6b, the object to be grabbed is sandwiched by the first fingers 6a and the second finger 6b so that the grabbing operation of the object to be grabbed such, as a physical body, can be carried out.

In accordance with the structure of the first embodiment of the present invention, when the finger-driving wires 13a and 13b are pulled by a force Fv, the force is transmitted through the finger-driving wires 13a and 13b, and distributed forces Fra and Frb (of which Frb is not shown) to be exerted on the arc-shaped guide grooves 11a and 11b and forces Fha and Fhb to be exerted on the finger-joint shaft arc-shaped guide portions 8a and 8b are generated. Among these, since the distributed forces Fra and Frb are received by the finger driving mechanism base 9 (arc-shaped guide grooves 11a and 11b thereof), no force is exerted on the hexaxial force sensor 2 itself, with the result that the pulling force by the wire pulling mechanism 16 is not observed by the hexaxial force sensor 2 as the distributed forces Fra and Frb. Moreover, the forces Fha and Fhb are transmitted to the finger-joint shafts 7a and 7b through the finger-joint shaft arc-shaped guide portions 8a and 8b so that forces Fja and Fjb are generated. Furthermore, the forces Fja and Fjb generate forces Fsa and Fsb on the hexaxial force sensor 2 through the finger driving mechanism base 9. However, since the forces Fsa and Fsb have the same magnitude and opposite directions, they cancel each other to make the resultant force virtually zero, with the result that no measurements are made by the hexaxial force sensor 2. That is, vectors of the driving forces that allow the pair of the opposed fingers 6a and 6b to move to open or close are aligned to be face to face with each other within a plane on which the pair of the opposed fingers 6a and 6b are allowed to move to open or close, so that the driving operation is carried out so as to make the vectors cancel each other to make the resultant force virtually zero; therefore, the forces in the directions of Fha and Fhb indicated by the arrows cancel with each other to cause no adverse effects to the hexaxial sensor 2.

On the other hand, in a case where an external force Fexa is directly applied to the tip of the first finger 6a, as shown in FIG. 4A, an equivalent force Fexj is also transmitted to the finger-joint shaft 7a through the first finger 6a, and further transmitted to the finger base 5 so that this force is measured by the hexaxial force sensor 2 as a force Fexs. Moreover, in a case where an external force is also applied to the second finger 6b or a grabbed object, an equivalent force Fexj is also transmitted to the finger-joint shaft 7b through the second finger 6b, and further transmitted to finger base 5 so that this force is measured by the hexaxial force sensor 2 as an external force Fexs.

In the above-mentioned explanation, only the effects on a translation force have been explained; however, since the moments generated in the hexaxial sensor 2 by the forces Fja and Fjb also cancel each other in the same manner, no adverse effects are given to the hexaxial sensor 2.

As described above, in accordance with the structure of the first embodiment of the present invention, since an actuator (for example, a motor 16a) can be installed outside the hand 23, it is possible to provide a hand 23 that has a light weight and exerts a high grip strength, and is designed in such a manner that, even when the force sensor 2 is installed between the hand 23 and the end portion of the robot arm 24, a driving force, given from outside, that drives the opening and closing movements of the first fingers 6a and the second finger 6b is made less influential to the force sensor 2; thus, a force-controlling operation can be easily carried out.

Second Embodiment

Figure 5A:
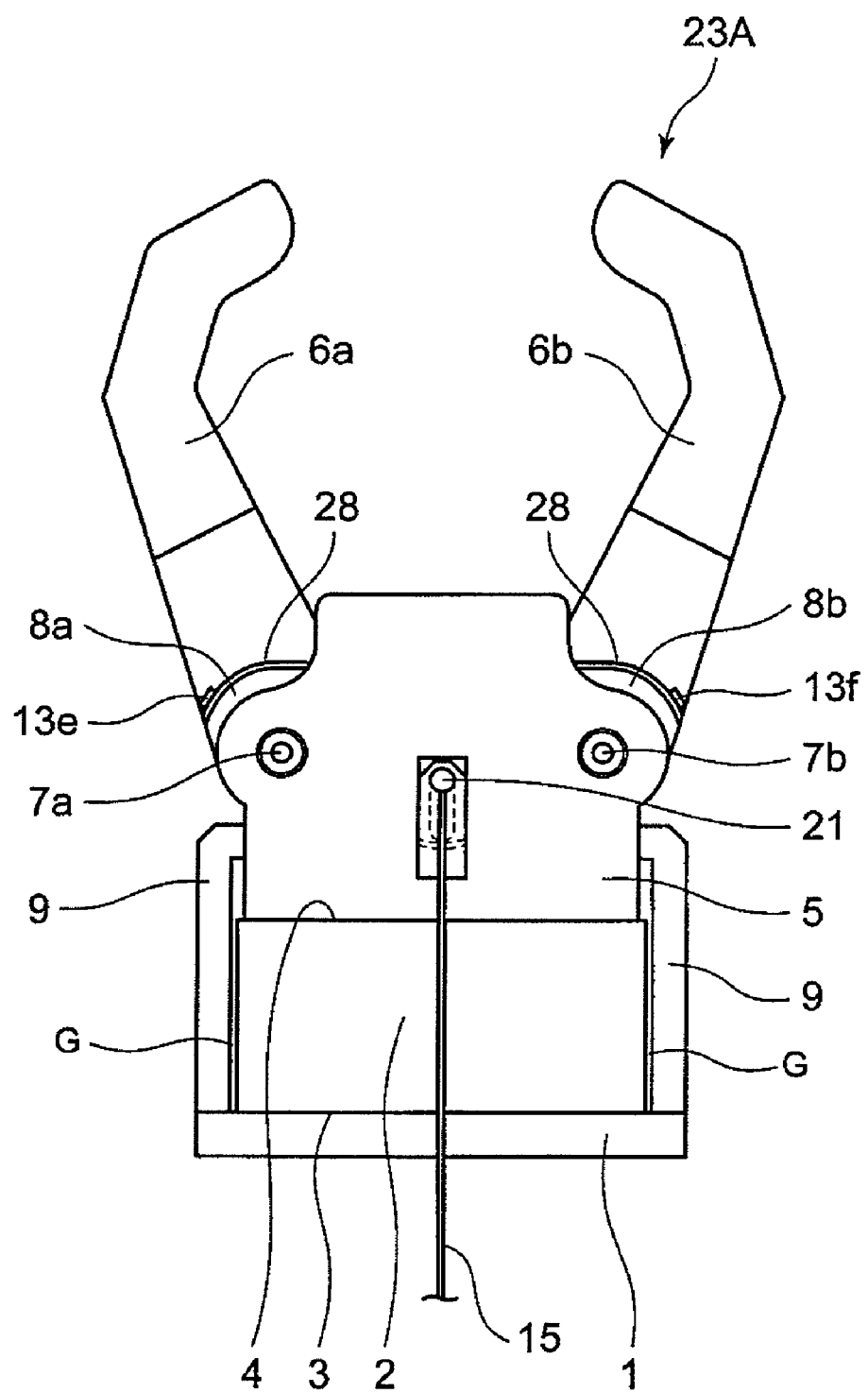
FIG. 5A is a front view that shows a schematic structure of a robot hand in accordance with a second embodiment of the present invention.
Figure 5B:
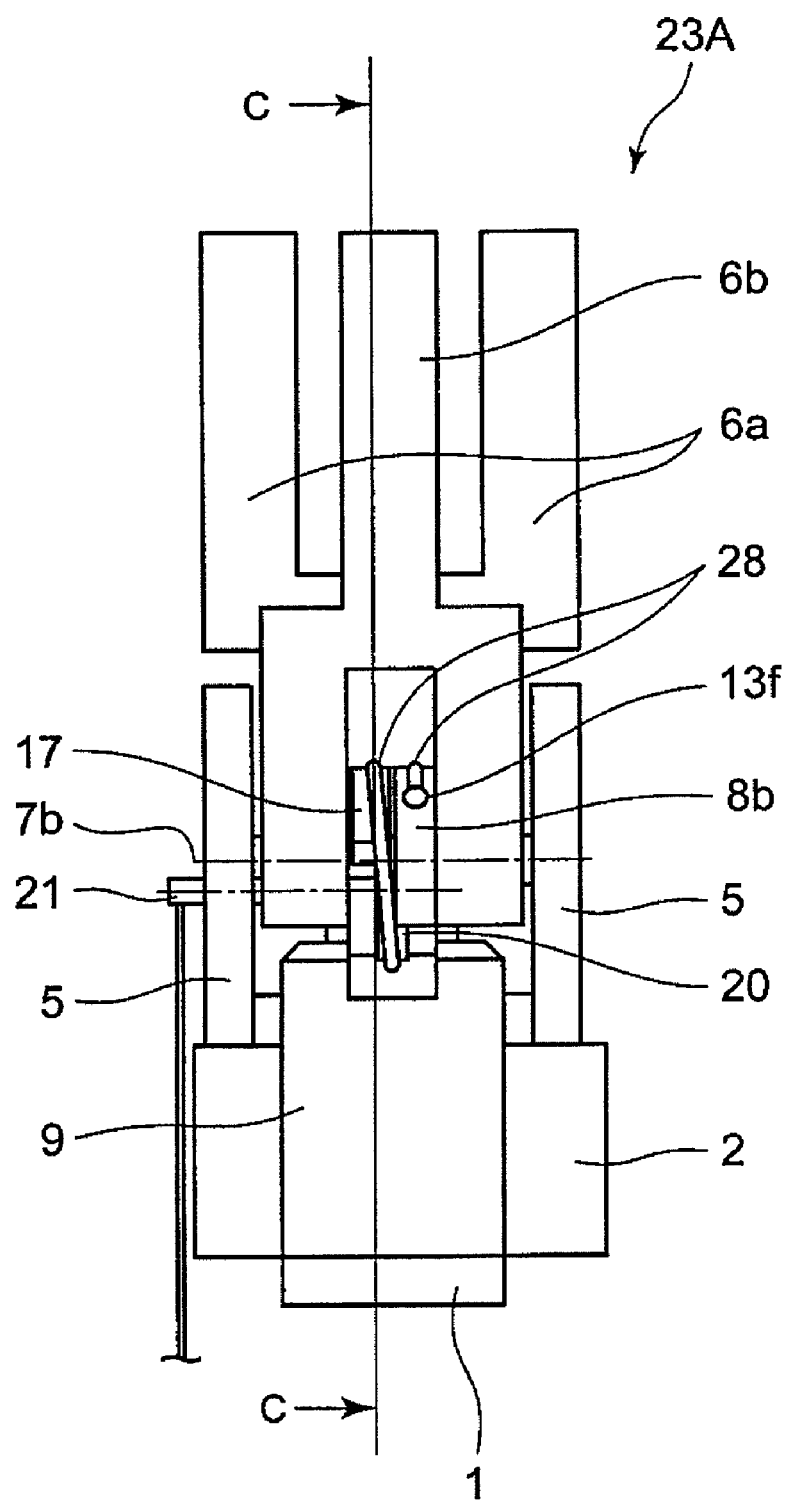
FIG. 5B is a side view that shows a schematic structure of the robot hand in accordance with the second embodiment of the present invention of FIG. 5A.
Figure 6A:
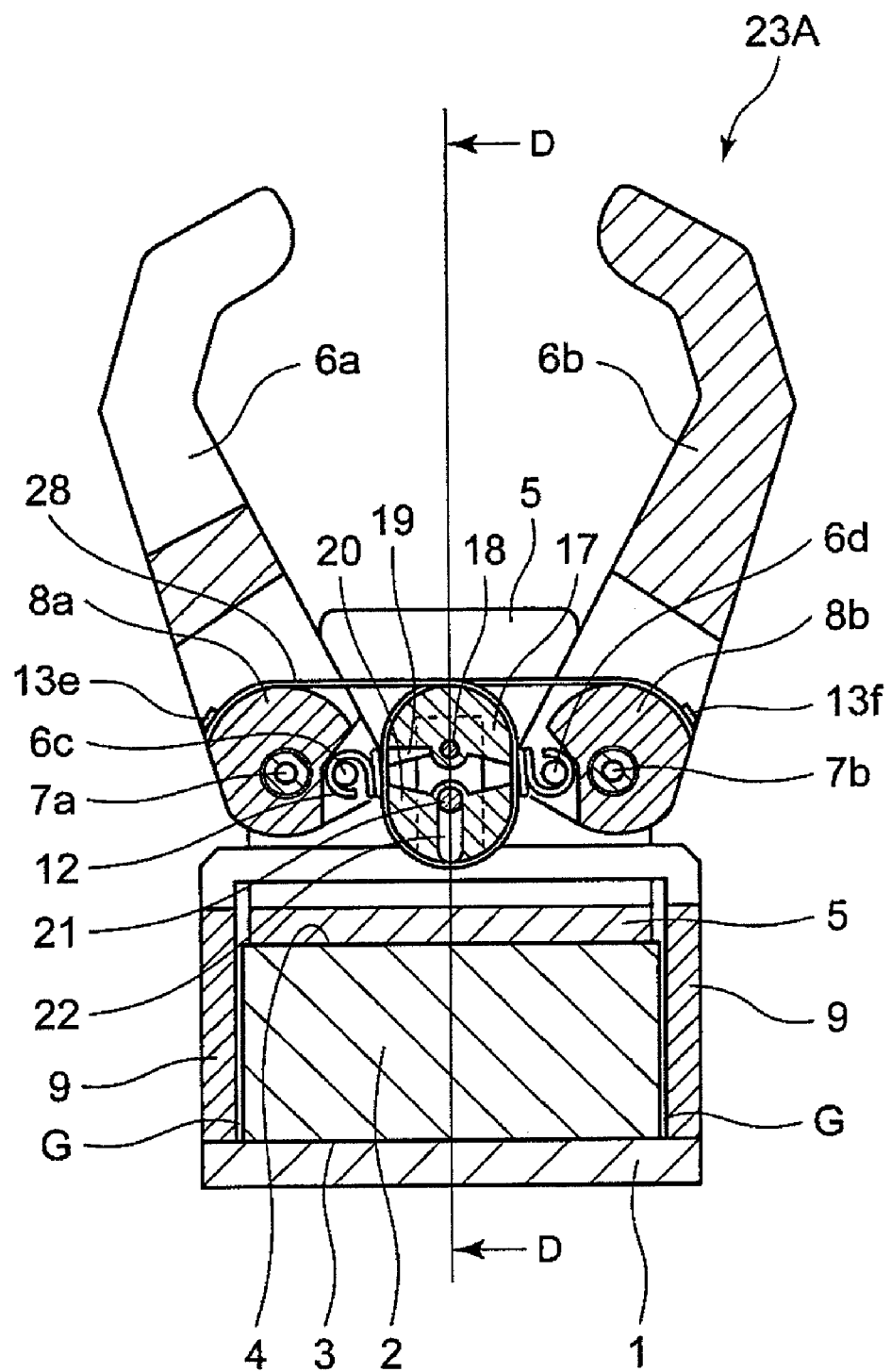
FIG. 6A is a cross-sectional view taken along line C-C of FIG. 5B that shows a structure of the robot hand in accordance with the second embodiment of the present invention of FIG. 5A.
Figure 6B:
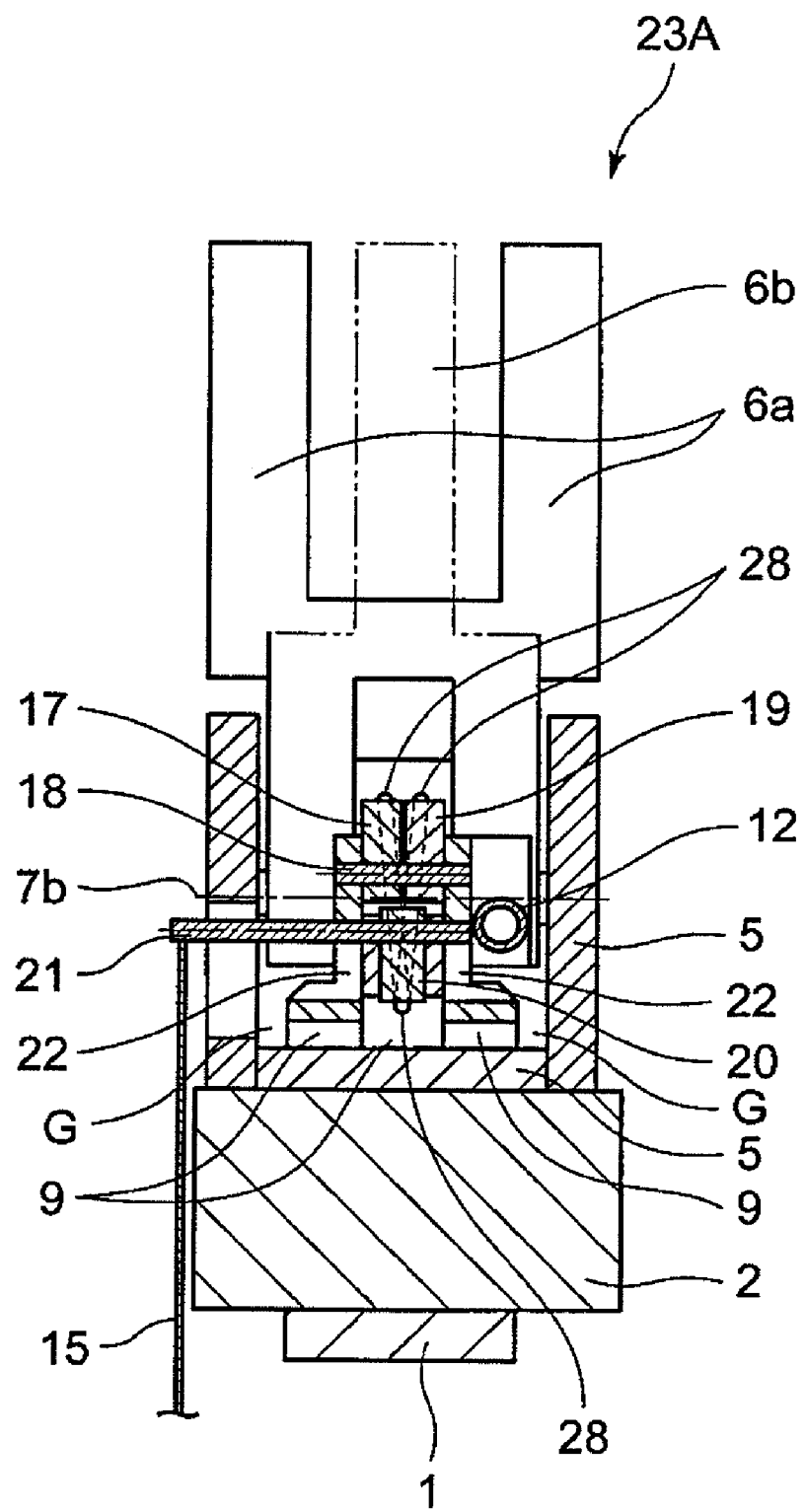
FIG. 6B is a cross-sectional view taken along line D-D of FIG. 6A that shows a structure of the robot hand in accordance with the second embodiment of the present invention of FIG. 5A.

FIGS. 5A and 5B are general views that show structures of a robot hand 23A in a second embodiment of the present invention. FIGS. 6A and 6B are views that respectively explain cross sections along lines C-C and D-D, respectively, of FIG. 5B. In FIGS. 5A to 6B, those portions having the same structures as those of the first embodiment shown in FIGS. 1A to 2B are indicated by the same reference numerals, with the detailed description thereof being omitted, and only the portions different therefrom are explained.

In FIGS. 5A to 6B, reference numeral 17 represents a first fixed pulley that is installed on a finger driving mechanism base 9 so as to rotate around a rotation shaft 18 supported by the finger driving mechanism base 9.

Reference numeral 19 represents a second fixed pulley that is installed on the finger driving mechanism base 9 so as to rotate around the rotation shaft 18 in a manner so as to be coaxial with the first fixed pulley 17.

Reference numeral 20 is a movable pulley that is supported so as to rotate around a slide rotation shaft 21, and is also installed on the finger driving mechanism base 9 in such a manner that the slide rotation shaft 21 can make a translation movement along a slide guide groove 22 of the finger driving mechanism base 9. One end portion of the pulling wire 15 is connected to the slide rotation shaft 21 so that, by pulling the pulling wire 15, the slide rotation shaft 21 is allowed to move along the slide guide groove 22, with the movable pulley 20 being supported by the slide rotation shaft 21 so as to rotate thereon.

One end portion and the other end portion of a finger driving wire 28 are respectively secured to finger-joint-shaft arc-shaped guide portions 8a and 8b of the first fingers 6a and the second finger 6b by using securing pins 13e and 13f. The finger driving wire 28 has its one end portion secured by the finger-joint-shaft arc-shaped guide portion 8a by the securing pin 13e, and is then passed along the arc face of the finger-joint-shaft arc-shaped guide portion 8a; thereafter, it is bent along an outer circumference of the first fixed pulley 17 by about 90°, and passed over the movable pulley 20, and then bent along the outer circumference of the movable pulley 20 by about 180°, and further passed over the second fixed pulley 19, and then bent along the outer circumference of the second fixed pulley 19 by about 90°. Thereafter, it is passed along the arc face of the finger-joint-shaft arc-shaped guide portion 8b so that the other end is secured to the finger-joint-shaft arc-shaped guide portion 8b by the securing pin 13f.

The following description will discuss operations of the robot hand 23A in accordance with the second embodiment.

Figure 7A:
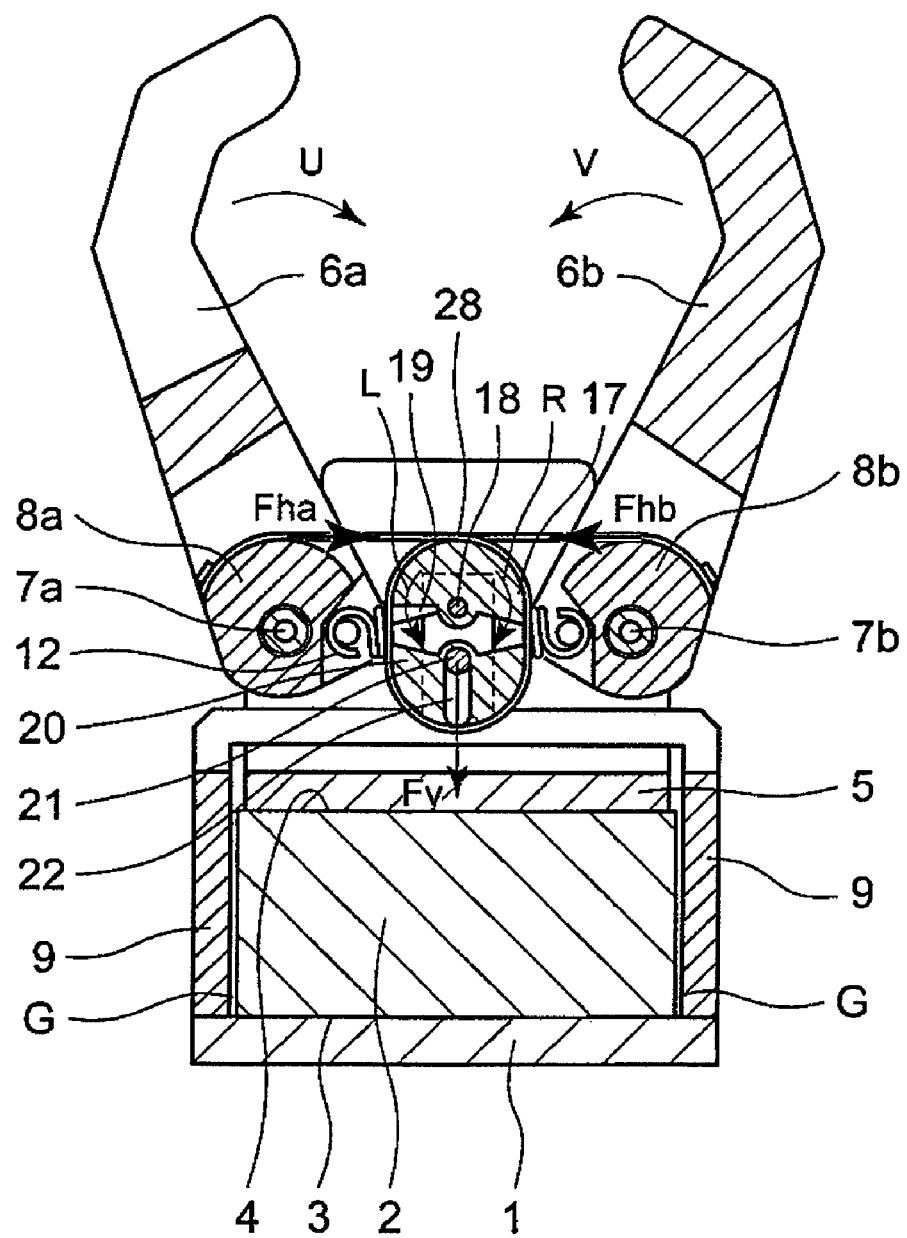
FIG. 7A is a view that explains an opening operation of the robot hand in accordance with the second embodiment of the present invention of FIG. 5A.
Figure 7B:
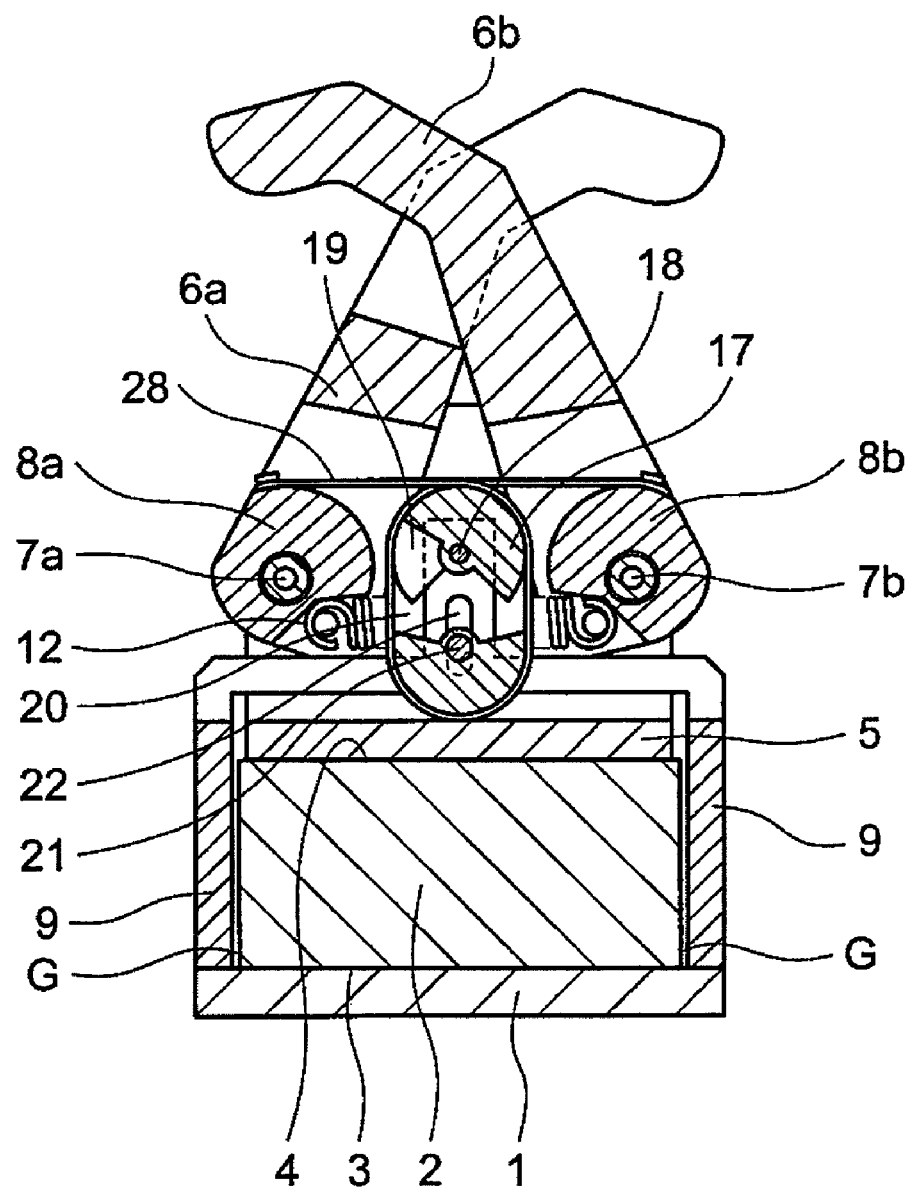
FIG. 7B is a view that explains a closing operation of the robot hand in accordance with the second embodiment of the present invention of FIG. 5A.

In a normal state, the robot hand 23A is kept in an open state as shown in FIG. 7A by a spring force of the finger releasing spring 12. The motor 16a is driven by instructions from the robot control device 29 so that the wire pulling mechanism 16 is operated, and when the pulling wire 15 is pulled, the movable pulley 20 is also pulled. Since the movable pulley 20 is movable relative to the finger driving mechanism base 9 along the slide guide groove 22 together with the slide rotation shaft 21, the middle portion of the finger driving wire 28 is pulled by the moving action of the movable pulley 20 so that both of the two end portions of the finger driving wire 28 are pulled by even forces (the same force). Since the respective end portions of the finger driving wire 28 are secured onto the first fingers 6a and the second finger 6b by the securing pins 13e and 13f in the finger-joint shaft arc-shaped guide portions 8a and 8b, the pulling force is transmitted to the first fingers 6a and the second finger 6b so that, when a torque caused by this pulling force overcomes the torque of the spring force of the finger releasing spring 12, the movable pulley 20 is shifted along the slide guide groove 22 together with the slide rotation shaft 21; thus, the first fixed pulley 17 is allowed to rotate rightward as indicated by an arrow R in FIG. 7A, and the second fixed pulley 19 is allowed to rotate leftward as indicated by an arrow L in FIG. 7A so that the two end portions of the finger driving wire 28 are moved in mutually approaching directions, with the result that the first fingers 6a are moved to rotate rightward on the drawing paper surface as indicated by an arrow U in FIG. 7A relative to the finger-joint shaft 7a (clockwise around the finger-joint shaft 7a in FIG. 7A), while the second finger 6b is moved to rotate leftward on the drawing paper surface as indicated by an arrow V in FIG. 7A relative to the finger-joint shaft 7b (counterclockwise around the finger-joint shaft 7b in FIG. 7A). Thus, as shown in FIG. 7B, the hand 23A is brought into a closed state, and when an object to be grabbed is located between the first fingers 6a and the second finger 6b, the object to be grabbed is sandwiched by the first fingers 6a and the second finger 6b so that the grabbing operation of the object to be grabbed, such as a physical body, can be carried out.

Figure 8A:
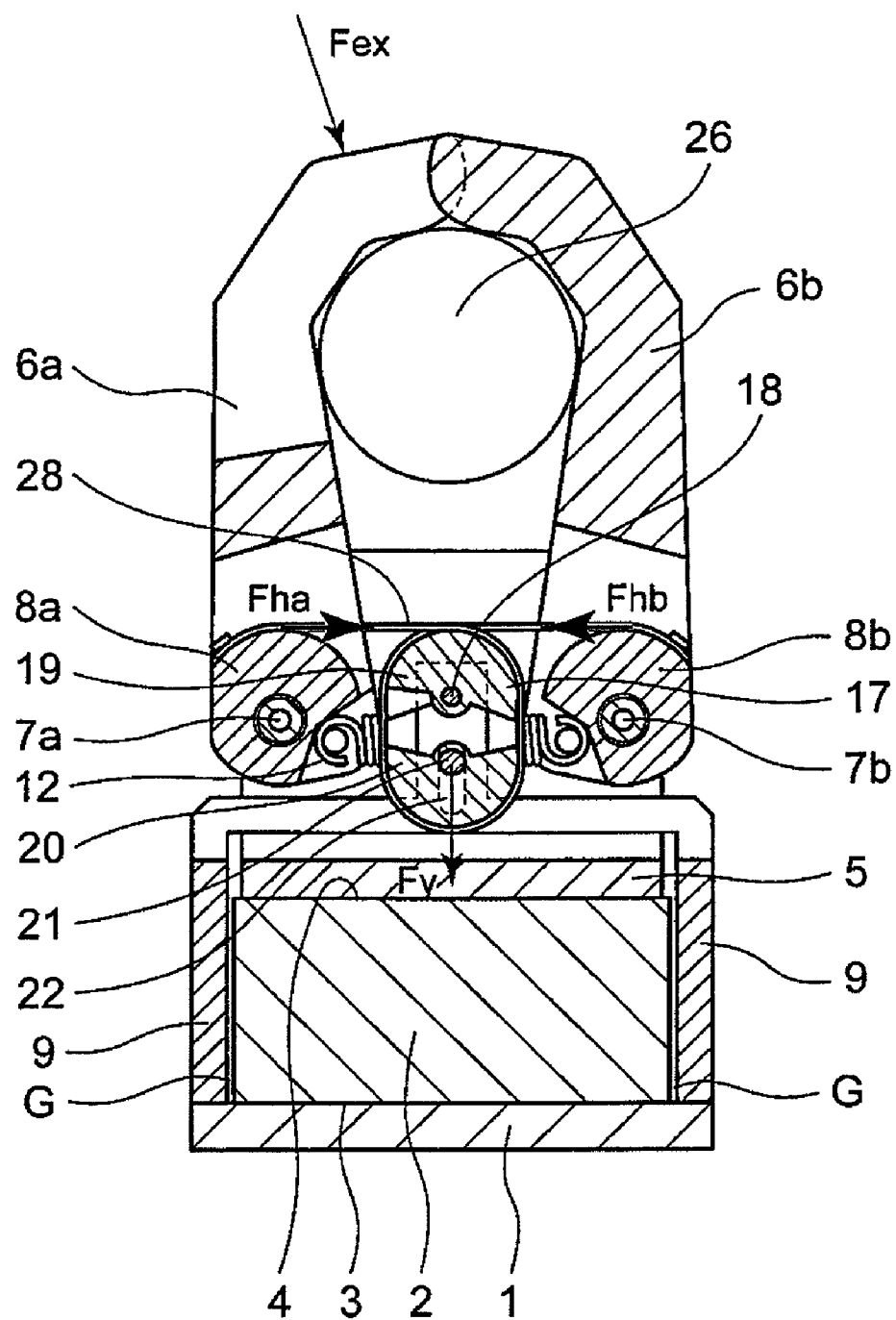
FIG. 8A is a view that explains an object grabbing operation by the structure of the robot hand in accordance with the second embodiment of the present invention of FIG. 5A.
Figure 8B:
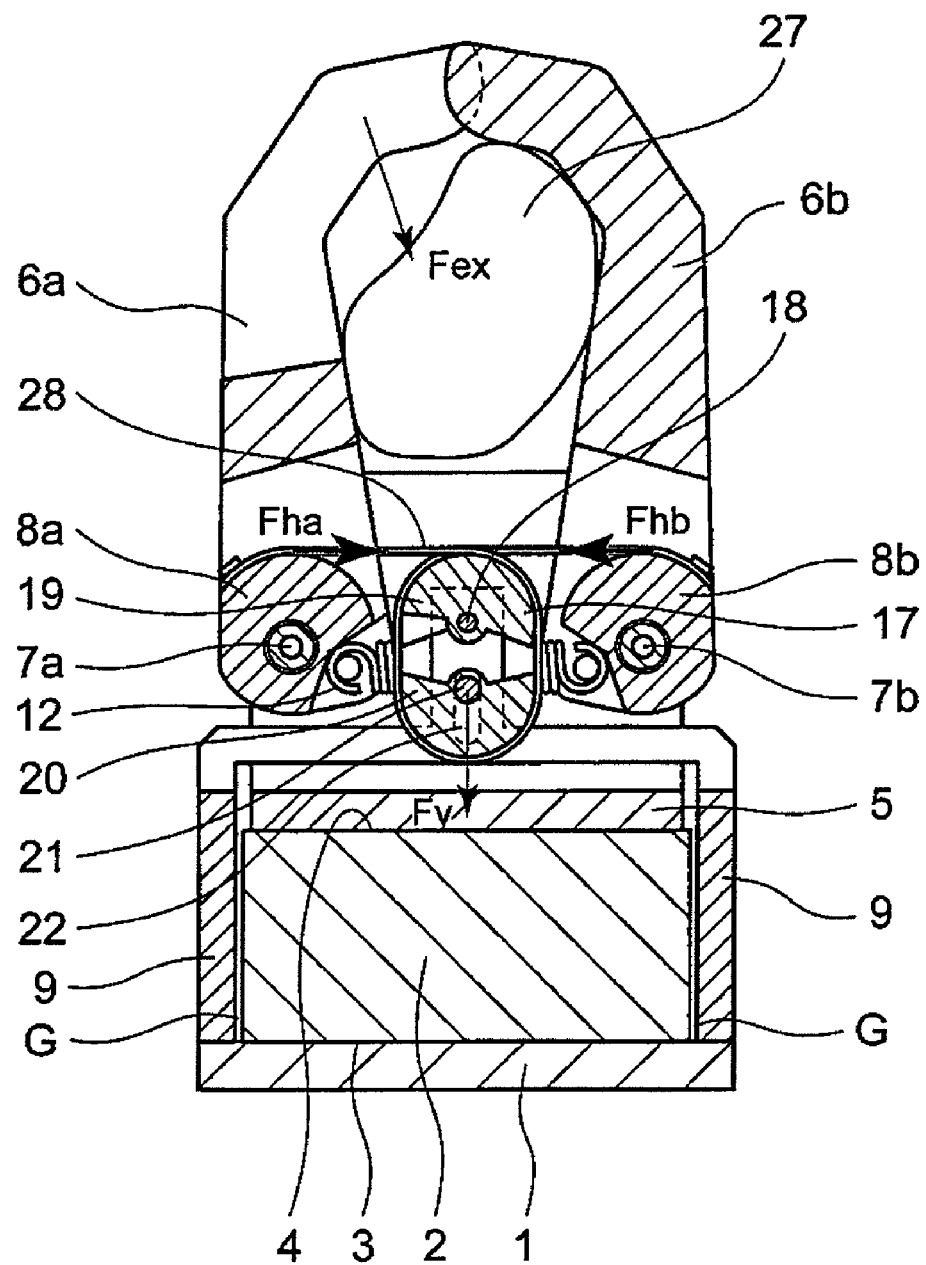
FIG. 8B is a view that explains another object grabbing operation by the structure of the robot hand in accordance with the second embodiment of the present invention of FIG. 5A.

For example, in a case where the object to be grabbed is an object 26 having a round cross section, as shown in FIG. 8A, the first fingers 6a and the second finger 6b are in contact with the object 26 at multiple points so that a stable grabbing operation of the object 26 is achieved from the viewpoint of statics. Moreover, as shown in FIG. 8B, even in a case where the object to be grabbed is an object 27 having an asymmetrical shape, the first fingers 6a and the second finger 6b are in contact with the object 27 at multiple points, and a stable state is consequently maintained from the viewpoint of statics so that the grabbing operation of the object 27 is achieved.

In accordance with the structure of the second embodiment of the present invention, since a force in an arrow Fv direction, generated by pulling the middle portion of the finger driving wire 28, is received by the finger driving mechanism base 9 through the first fixed pulley 17 and the second fixed pulley 19, no force is exerted on the hexaxial force sensor 2 itself, with the result that the pulling force by the wire pulling mechanism 16 gives no effects to the hexaxial force sensor 2. Moreover, with respect to forces in directions indicated by arrows Fha and Fhb of the wire 28, since one end portion of the wire 28 is passed over from the finger-joint shaft arc-shaped guide portion 8a onto the first fixed pulley 17, with the other end portion being passed over from the finger-joint shaft arc-shaped guide portion 8b onto the second fixed pulley 19 in an opposite manner, the forces in the arrow Fha and Fhb directions cancel each other, giving no effects to the hexaxial force sensor 2.

On the other hand, in a case where an external force Fexa is exerted on the first fingers 6a, the second finger 6b, or the object to be grabbed, since the stably grabbed object, the first fingers 6a, and the second finger 6b are operated as an integral unit, an external force Fexj is transmitted to the force sensor 2 through the finger-joint shafts 7a and 7b and the finger base 5 so that the external force Fexs is detected by the force sensor 2.

Third Embodiment

Figure 9A:
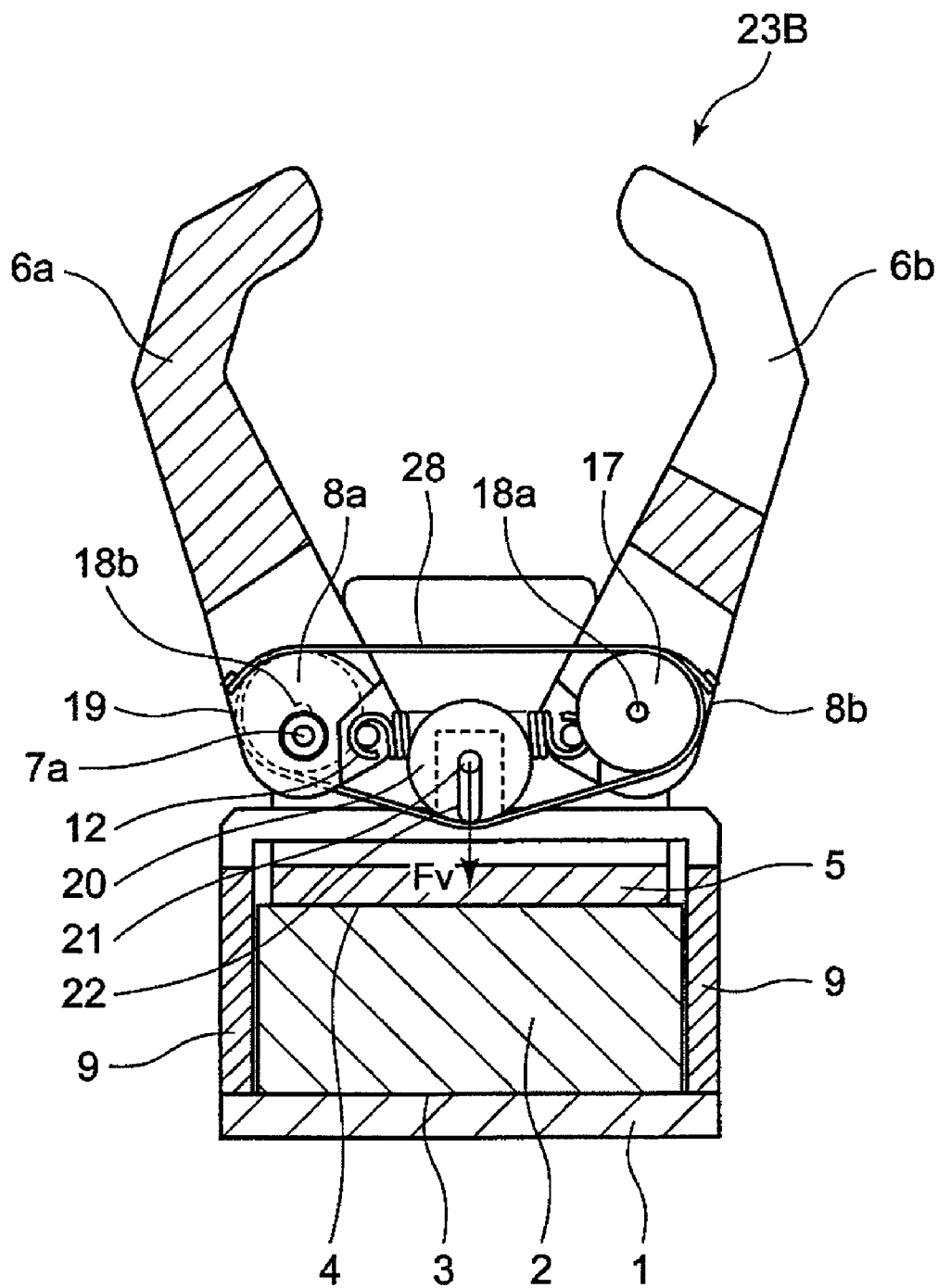
FIG. 9A is a cross-sectional view that shows a structure of a robot hand in accordance with a third embodiment of the present invention.
Figure 9B:
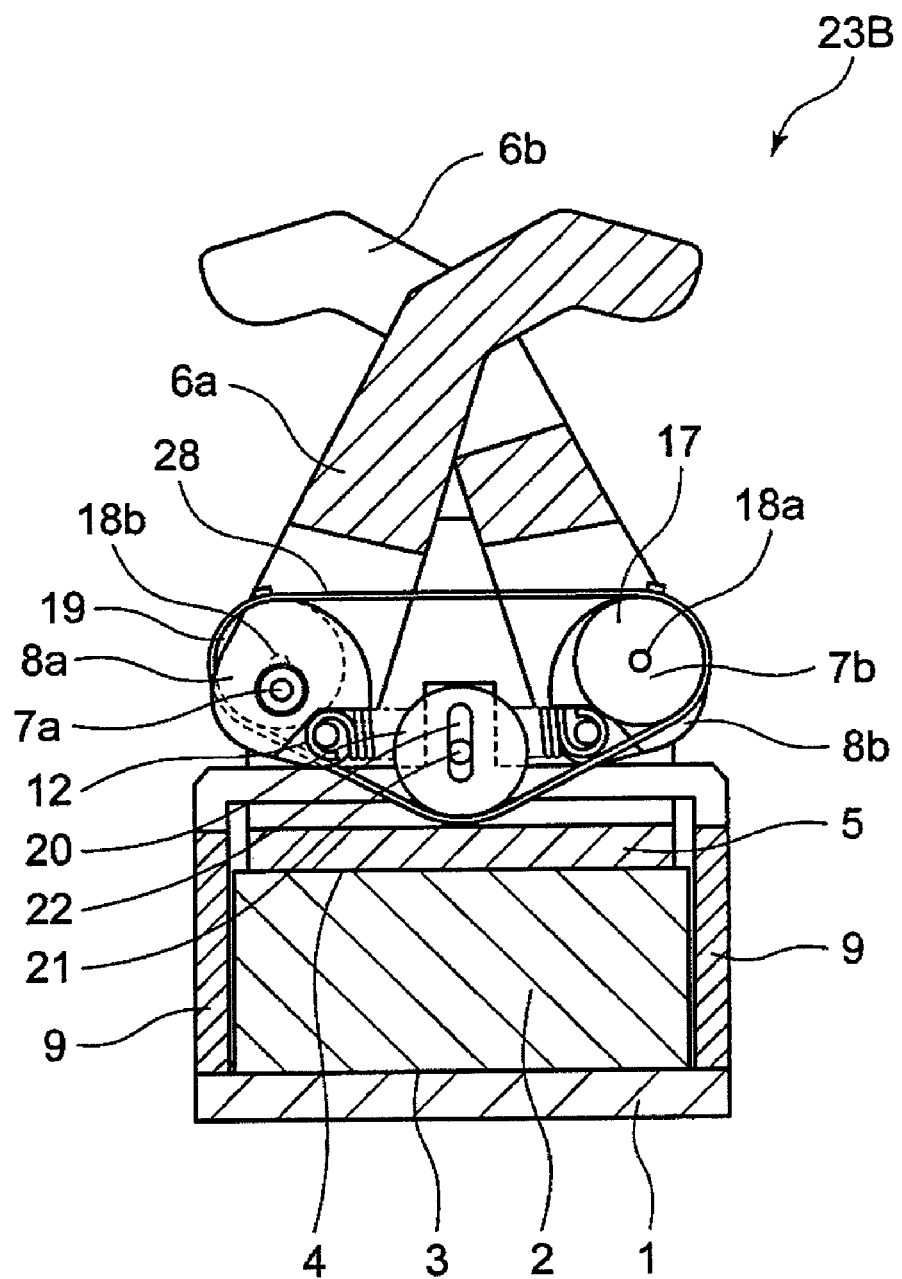
FIG. 9B is a cross-sectional view that shows the structure of the robot hand in accordance with the third embodiment of the present invention.

FIGS. 9A and 9B are cross-sectional views that show structures of a robot hand 23B in accordance with a third embodiment of the present invention. The third embodiment shows an example that is constituted by fixed pulleys and a movable pulley in the same manner as in the second embodiment, and differs from the second embodiment in the positions of two fixed pulleys. In FIGS. 9A and 9B, those portions having the same structures as those of the second embodiment shown in FIG. 6A are indicated by the same reference numerals, with the detailed description thereof being omitted, and only the portions different therefrom are explained.

In FIGS. 9A to 9B, reference numeral 17 represents a first fixed pulley that is installed on a finger driving mechanism base 9 so as to rotate around a rotation shaft 18a supported by the finger driving mechanism base 9.

Reference numeral 19 represents a second fixed pulley that is installed on the finger driving mechanism base 9 so as to rotate around the rotation shaft 18b.

The third embodiment is characterized in that the first fixed pulley 17 and the second fixed pulley 19 are not disposed coaxially with each other, but placed near the respective finger-joint shafts 7a and 7b. Even in this structure in which the first fixed pulley 17 and the second fixed pulley 19 are apart from each other, the same effects as those of the second embodiment can be obtained.

Figure 10A:
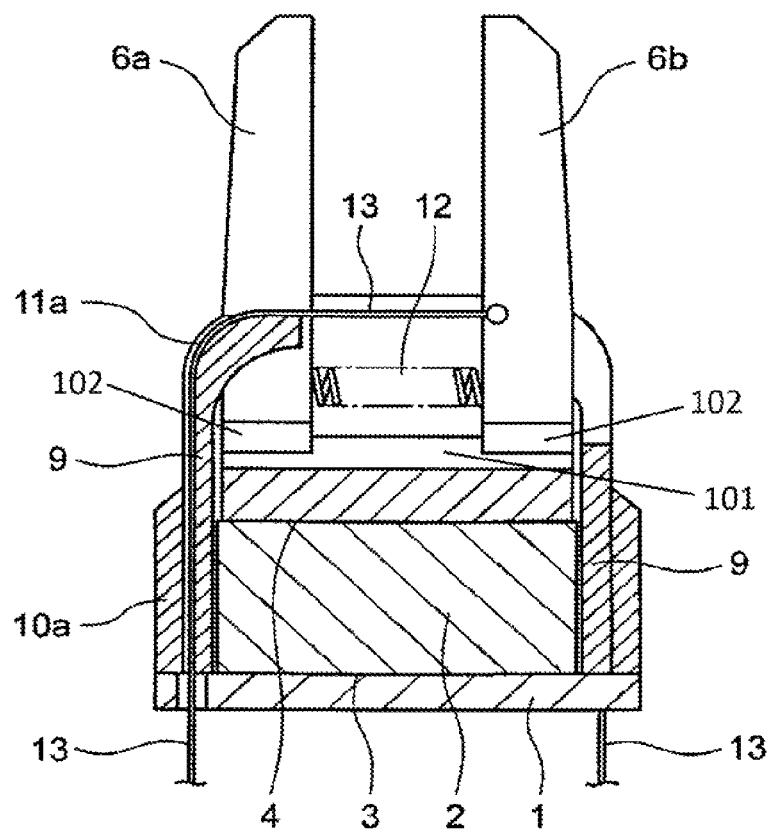
FIG. 10A is a view that explains a finger structure in accordance with a modified example of the present invention.
Figure 10B:
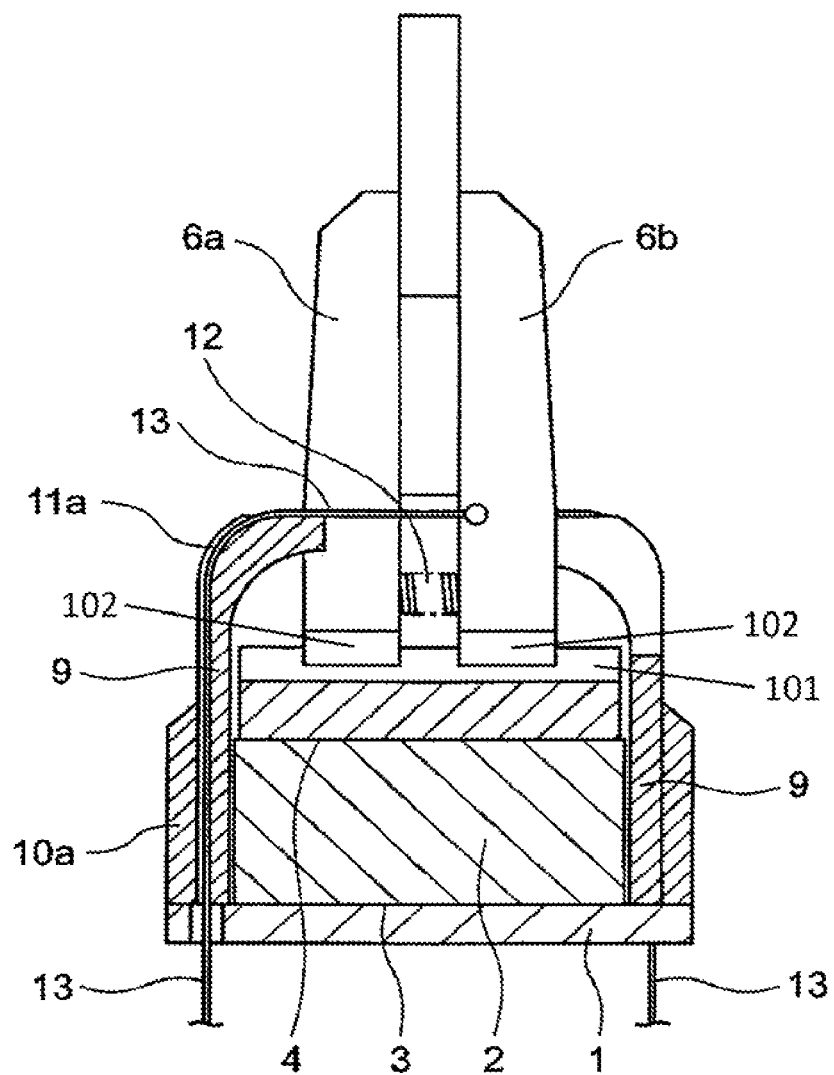
FIG. 10B is a view that explains the finger structure in accordance with the modified example of the present invention.

Additionally, the above-mentioned embodiments have a structure in which the first fingers 6a and the second finger 6b are allowed to carry out rocking movements by the finger-joint shafts 7a and 7b; however, the invention is not limited by this structure and, for example, a finger structure in which opening and closing operations are carried out by parallel movements by the use of a linear guide mechanism as shown in FIGS. 10A and 10B may be used, and the same effects can be obtained. The linear guide mechanism is configured by, for example, a rail 101 and a slider 102 that is assembled along the rail 101 so as to freely slide thereon, and concave portions are respectively formed on the rail 101 side and the slider 102 side, with a ball bearing being disposed in a manner so as to bridge over the concave portions, so that the slider 102 can be assembled onto the rail 101, and maintained thereon so as not to come off the rail 101.

Additionally, among the above-mentioned various embodiments or modified examples, by combining desired embodiments or modified examples with one another on demand, it is possible to obtain the respective effects.

A robot hand and a robot arm having the robot hand of the present invention can be effectively used as a robot hand used for grabbing an object by the use of a multi-joint robot arm and a robot arm having such a robot hand.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A robot hand comprising:
a hand attaching base portion;
a force sensor disposed on the hand attaching base portion;
a finger base that is disposed on a measuring unit for the force sensor;
a pair of fingers that are disposed so as to be opposed to each other on the finger base;
a finger-driving mechanism base that is disposed on the hand attaching base portion, with such that gaps are formed between the finger-driving mechanism base and each of the force sensor, the finger base, and the paired fingers;
a finger driving mechanism that has a wire having respective end portions connected to the paired fingers opposed to each other, that is disposed on the finger-driving mechanism base so as to allow paths extending from the end portions to be opposed to each other so that, by pulling the wire in opposite directions with a same force, the paired opposed fingers are opened and closed; and
an actuator that is disposed outside the hand, and used for operating the finger driving mechanism.

2. The robot hand according to claim 1, wherein the finger driving mechanism base has a wire guide unit for guiding a movement of the wire of the finger driving mechanism.

3. The robot hand according to claim 2, wherein the paired fingers are supported by a pair of joint shafts supported so as to be opposed to the finger base, in a manner so as to rock respectively thereon, and have finger-joint shaft arc-shaped guide portions each having an arc shape that is coaxial with each of the joint shafts, the finger driving mechanism base has arc-shaped guide grooves each having an arc shape that is coaxial with each of the joint shafts, with the end portion of the wire being engaged with one of the paired fingers, so that the wire is passed along an arc-shaped face of the finger-joint shaft arc-shaped guide portion of the corresponding finger, disposed in parallel with a measuring face of the force sensor for measuring a force applied between the base portion of the finger and the base of the hand as well as in parallel with the attaching face of the force sensor of the hand attaching base portion, and is also passed over to the arc-shaped guide groove that is coaxial with the joint shaft that supports the other finger that is opposed to the corresponding finger so that the wire is disposed on the finger driving mechanism base in a manner so as to make paths extending from the end portions to be made face to face with each other.

4. A robot arm comprising: an end portion thereof that is attached to the hand attaching base portion of the robot hand in accordance with claim 3.

5. The robot hand according to claim 2, wherein the finger driving mechanism has the wire, first and second fixed pulleys that are respectively secured coaxially onto the finger driving mechanism base so as to rotate thereon, and a movable pulley that is supported on a rotation shaft connected to the actuator so as to rotate thereon, and is also supported by the finger driving mechanism base so as to move in a direction that intersects the center axis direction of the rotation shaft together with the rotation shaft, so that, with the end portion of the wire being connected to one of the opposed fingers, the wire is passed through the first fixed pulley, the movable pulley, and the second fixed pulley in succession, with the other end portion different from the end portion being connected to the other opposed finger, and by driving the actuator, the rotation shaft of the movable pulley is moved in a direction that intersects a center axis direction of the rotation shaft relative to the finger driving mechanism base to allow the paired fingers to open or close.

6. The robot hand according to claim 2, wherein at least one of the fingers has a bow-like curved shape, or a shape having a tip portion curved into an L shape.

7. A robot arm comprising: an end portion thereof that is attached to the hand attaching base portion of the robot hand in accordance with claim 2.

8. The robot hand according to claim 1, wherein the finger driving mechanism comprises: a movable pulley that is supported by a rotation shaft connected to the actuator so as to rotate thereon, and is also supported by the finger driving mechanism base so as to move together with the rotation shaft in a direction that intersects a center axis direction of the rotation shaft so that, by pulling the wire in opposite directions by the same force without regulating movements of the paired opposed fingers in a same direction, movements in reversed directions of the paired opposed fingers are generated so that the paired opposed fingers are opened or closed.

9. The robot hand according to claim 8, wherein the finger driving mechanism has the wire, first and second fixed pulley that are respectively secured coaxially onto the finger driving mechanism base so as to rotate thereon, and a movable pulley that is supported on a rotation shaft connected to the actuator so as to rotate thereon, and is also supported by the finger driving mechanism base so as to move in a direction that intersects the center axis direction of the rotation shaft together with the rotation shaft, so that, with the end portion of the wire being connected to one of the opposed fingers, the wire is passed through the first fixed pulley, the movable pulley, and the second fixed pulley in succession, with the other end portion different from the end portion being connected to the other opposed finger, and by driving the actuator, the rotation shaft of the movable pulley is moved in a direction that intersects a center axis direction of the rotation shaft relative to the finger driving mechanism base to allow the paired fingers to open or close.

10. The robot hand according to claim 8, wherein at least one of the fingers has a bow-like curved shape, or a shape having a tip portion curved into an L shape.

11. A robot arm comprising: an end portion thereof that is attached to the hand attaching base portion of the robot hand in accordance with claim 8.

12. The robot hand according to claim 1, wherein the finger driving mechanism has the wire, first and second fixed pulleys that are respectively secured coaxially onto the finger driving mechanism base so as to rotate thereon, and a movable pulley that is supported on a rotation shaft connected to the actuator so as to rotate thereon, and is also supported by the finger driving mechanism base so as to move in a direction that intersects the center axis direction of the rotation shaft together with the rotation shaft, so that, with the end portion of the wire being connected to one of the opposed fingers, the wire is passed through the first fixed pulley, the movable pulley, and the second fixed pulley in succession, with the other end portion different from the end portion being connected to the other opposed finger, and by driving the actuator, the rotation shaft of the movable pulley is moved in a direction that intersects a center axis direction of the rotation shaft relative to the finger driving mechanism base to allow the paired fingers to open or close.

13. The robot hand according to claim 1, wherein at least one of the fingers has a bow-like curved shape, or a shape having a tip portion curved into an L shape.

14. A robot arm comprising: an end portion thereof that is attached to the hand attaching base portion of the robot hand in accordance with claim 1.

* * * * *

UNITED STATES PATENT AND TRADEMARK OFFICE
CERTIFICATE OF CORRECTION

PATENT NO. : 8,157,305 B2  
APPLICATION NO. : 12/670421  
DATED : April 17, 2012  
INVENTOR(S) : Yasunao Okazaki et al.

Page 1 of 1

It is certified that error appears in the above-identified patent and that said Letters Patent is hereby corrected as shown below:

IN THE CLAIMS
In column 11, line 59 (claim 1, line 9) "hand attaching base portion, with such that gaps are" should read --hand attaching base portion, such that gaps are--.

In column 13, line 2 (claim 9, line 2) "first and second fixed pulley" should read --first and second fixed pulleys--.

Signed and Sealed this
Twenty-eighth Day of August, 2012

David J. Kappos
*Director of the United States Patent and Trademark Office*